US012573169B2

(12) United States Patent
Chen et al.

(10) Patent No.: US 12,573,169 B2
(45) Date of Patent: Mar. 10, 2026

(54) COMMON VIEW REGION IDENTIFICATION AND SCALE ALIGNMENT FOR FEATURE MATCHING IN IMAGE PAIRS

(71) Applicant: TENCENT TECHNOLOGY (SHENZHEN) COMPANY LIMITED, Shenzhen (CN)

(72) Inventors: Ying Chen, Shenzhen (CN); Shang Xu, Shenzhen (CN); Dihe Huang, Shenzhen (CN); Jianlin Liu, Shenzhen (CN); Yong Liu, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 18/333,091

(22) Filed: Jun. 12, 2023

(65) Prior Publication Data

US 2023/0326173 A1     Oct. 12, 2023

Related U.S. Application Data

(63) Continuation of application No. PCT/CN2022/131464, filed on Nov. 11, 2022.

(30) Foreign Application Priority Data

Jan. 25, 2022    (CN) .......................... 202210088988.6

(51) Int. Cl.
*G06V 10/44* (2022.01)
*G06T 3/40* (2024.01)
(Continued)

(52) U.S. Cl.
CPC ................ *G06V 10/44* (2022.01); *G06T 3/40* (2013.01); *G06T 7/10* (2017.01); *G06V 10/25* (2022.01);
(Continued)

(58) Field of Classification Search
CPC .... H04N 5/272; H04N 21/2187; H04N 23/61; H04N 23/951; G06T 7/194; G06T 5/50;
(Continued)

(56) References Cited

U.S. PATENT DOCUMENTS 8,446,352 B2 * 5/2013 You ...................... G09G 3/3648
345/694
9,465,994 B1 * 10/2016 Mishra ................... G06V 10/96
(Continued)

FOREIGN PATENT DOCUMENTS

CN         110399799 A     11/2019
CN         111402146 A      7/2020
(Continued)

OTHER PUBLICATIONS

Zhou; Lisha et al. "Multi-View Reconstruction of Landscape Images Considering Image Registration and Feature Mapping", Jan. 20, 2025, IEEE (Year: 2025).*

(Continued)

*Primary Examiner* — Aaron W Carter
*Assistant Examiner* — Alejandro Hernandez
(74) *Attorney, Agent, or Firm* — Anova Law Group, PLLC

(57) ABSTRACT

Embodiments of this application disclose an image processing method and apparatus, and a computer-readable storage medium. The method includes acquiring an image pair to be processed, and performing image feature extraction on an image to be processed in the image pair to be processed to obtain an image; extracting an association feature from the image feature, the association feature characterizing mutual information between images in the image pair to be processed; identifying a common view image of a common view region in the image to be processed according to the association feature, and calculating a scale difference (Continued)

between common view images; adjusting a size of the common view image based on the scale difference to obtain an adjusted common view image; and extracting at least one common view feature point from each of the adjusted common view images, and processing the image based on the common view feature point.

20 Claims, 8 Drawing Sheets

(51) Int. Cl.

| | |
|---|---|
| *G06T 7/10* | (2017.01) |
| *G06V 10/25* | (2022.01) |
| *G06V 10/74* | (2022.01) |
| *G06V 10/771* | (2022.01) |
| *G06V 10/80* | (2022.01) |

(52) U.S. Cl.
CPC .......... *G06V 10/761* (2022.01); *G06V 10/771* (2022.01); *G06V 10/806* (2022.01); *G06T 2207/20081* (2013.01)

(58) Field of Classification Search
CPC .......... G06T 3/04; G06T 3/4038; G06T 7/10; G06T 3/40; G06T 2207/20081; G06T 7/0002; G06T 7/11; G06T 11/60; G06V 10/60; G06V 10/751; G06V 10/16; G06V 10/44; G06V 20/50; G06V 10/25; G06V 10/806; G06V 10/771; G06V 10/761; G06V 10/80; G06V 10/77; G06V 10/70; G06V 10/40; G06F 18/211; G06F 18/21; G06F 18/20; G06F 18/24; G06F 18/22; G06F 18/25; G06F 18/253
See application file for complete search history.

(56) References Cited

U.S. PATENT DOCUMENTS

| | | | | |
|---|---|---|---|---|
| 9,904,980 | B2 * | 2/2018 | Lim | G06T 3/4007 |
| 12,347,227 | B2 * | 7/2025 | Zhang | G06V 40/1335 |
| 2009/0007019 | A1 * | 1/2009 | Kobayashi | G06F 16/51 |
| | | | | 715/838 |
| 2010/0013938 | A1 * | 1/2010 | Fukuda | G06T 7/12 |
| | | | | 348/208.4 |

| | | | | |
|---|---|---|---|---|
| 2012/0203759 | A1 * | 8/2012 | Kim | G06F 16/51 |
| | | | | 707/E17.02 |
| 2014/0270484 | A1 * | 9/2014 | Chandraker | G06T 7/246 |
| | | | | 382/154 |
| 2016/0124209 | A1 | 5/2016 | Arai | |
| 2020/0202137 | A1 * | 6/2020 | Li | H04W 4/35 |
| 2021/0295478 | A1 * | 9/2021 | Liao | G06V 20/64 |
| 2022/0019838 | A1 * | 1/2022 | Dou | G06V 10/40 |
| 2022/0148302 | A1 * | 5/2022 | Bao | G06V 10/761 |
| 2022/0237789 | A1 * | 7/2022 | Nie | G06F 18/2414 |
| 2022/0245954 | A1 * | 8/2022 | Wu | G06V 20/63 |
| 2023/0068238 | A1 * | 3/2023 | Li | G06V 20/56 |
| 2023/0258588 | A1 * | 8/2023 | Katsuyama | G01N 25/72 |
| | | | | 374/4 |
| 2023/0281826 | A1 * | 9/2023 | Schulter | G06V 10/761 |
| | | | | 382/173 |
| 2023/0281965 | A1 * | 9/2023 | Lee | G06V 10/764 |
| 2024/0237411 | A1 * | 7/2024 | Yang | H10K 59/122 |
| 2024/0303962 | A1 * | 9/2024 | Li | G06V 10/44 |
| 2024/0311964 | A1 * | 9/2024 | Li | G06T 3/4053 |
| 2024/0346832 | A1 * | 10/2024 | Shin | G01C 21/3837 |
| 2025/0016454 | A1 * | 1/2025 | Sun | H04N 19/105 |
| 2025/0036135 | A1 * | 1/2025 | Furukawa | G05D 1/242 |
| 2025/0244487 | A1 * | 7/2025 | Patath | G01S 19/485 |

FOREIGN PATENT DOCUMENTS

| | | | | | |
|---|---|---|---|---|---|
| CN | 112232258 | A | | 1/2021 | |
| CN | 112967330 | A | | 6/2021 | |
| CN | 114445633 | A | | 5/2022 | |
| CN | 115082254 | A | * | 9/2022 | G06N 3/08 |
| CN | 118982623 | A | * | 11/2024 | G06N 3/08 |
| JP | 2018005435 | A | | 1/2018 | |

OTHER PUBLICATIONS

The European Patent Office (EPO) The Extended European Search Report for Application No. 22923396.0 Feb. 3, 2025 7 Pages.

Tongkun Guan et al. "Industrial scene text detection with refined feature-attentive network." IEEE Transactions on Circuits and Systems for Video Technology 32.9 (2021): 6073-6085.

Ying Chen et al. "Guide local feature matching by overlap estimation." Proceedings of the AAAI conference on artificial intelligence. vol. 36. No. 1. 2022.

The World Intellectual Property Organization (WIPO) International Search Report for PCT/CN2022/131464 Jan. 12, 2023 13 Pages (including translation).

* cited by examiner

Computer device

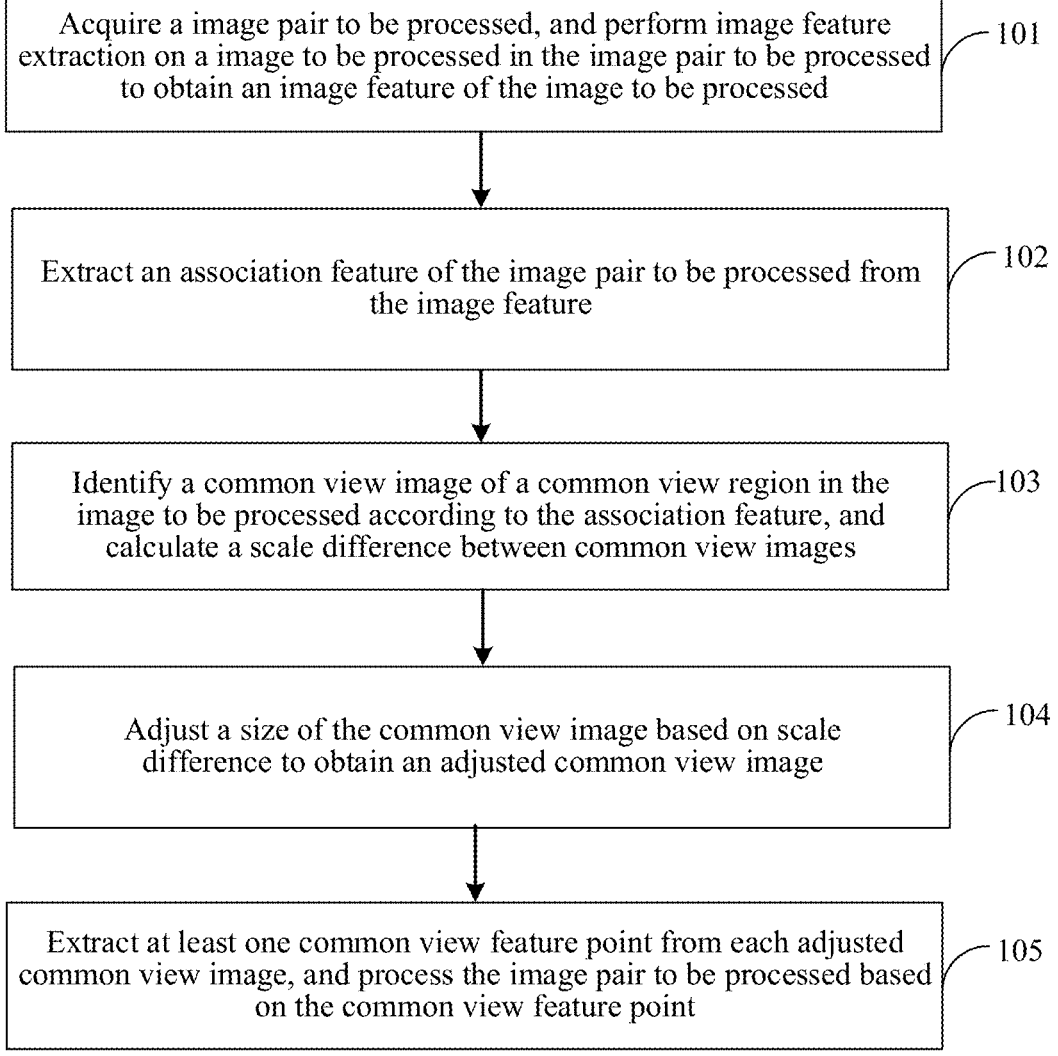

Acquire a image pair to be processed, and perform image feature extraction on a image to be processed in the image pair to be processed to obtain an image feature of the image to be processed — 101

Extract an association feature of the image pair to be processed from the image feature — 102

Identify a common view image of a common view region in the image to be processed according to the association feature, and calculate a scale difference between common view images — 103

Adjust a size of the common view image based on scale difference to obtain an adjusted common view image — 104

Extract at least one common view feature point from each adjusted common view image, and process the image pair to be processed based on the common view feature point — 105

FIG. 2

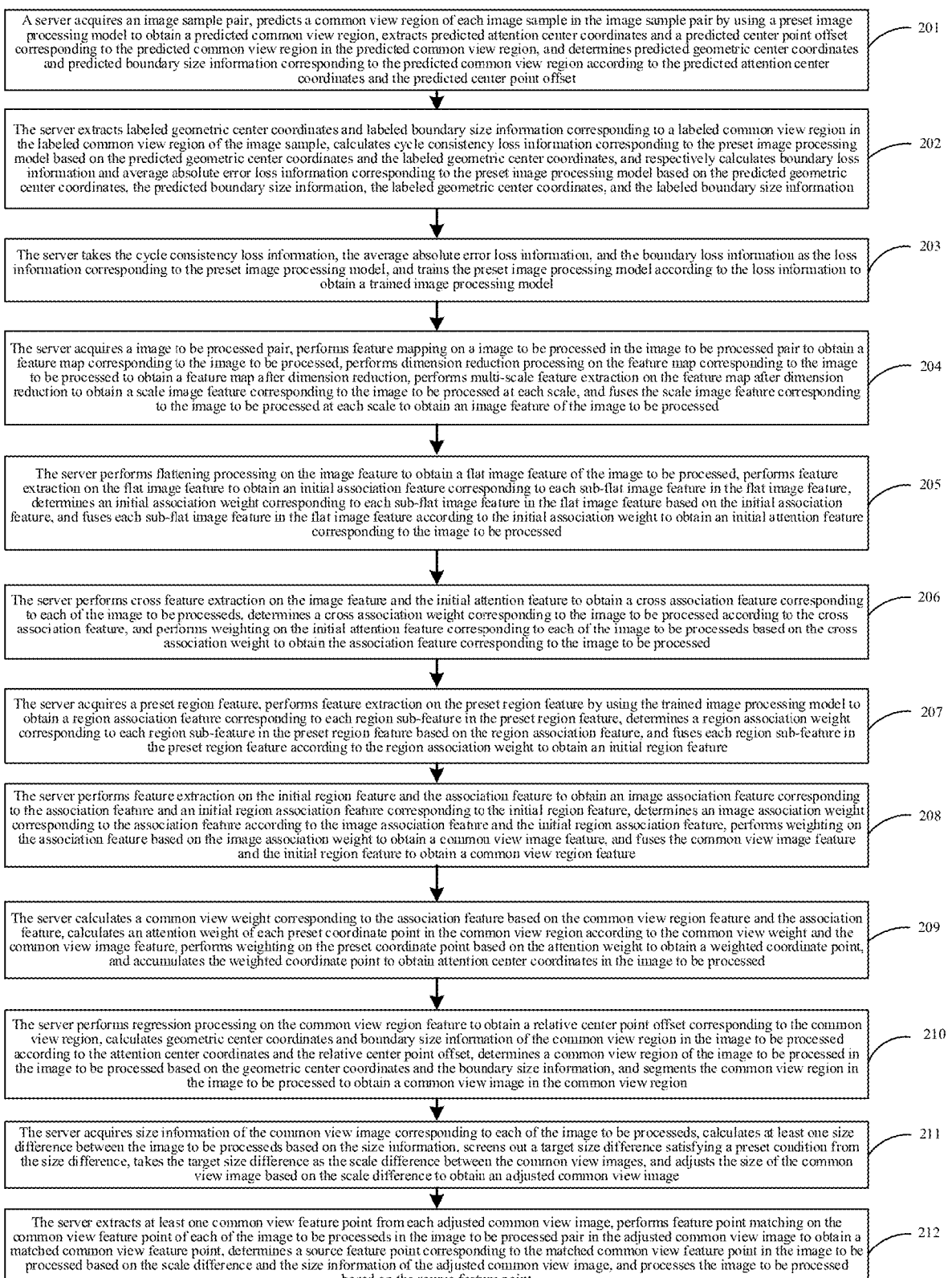

A server acquires an image sample pair, predicts a common view region of each image sample in the image sample pair by using a preset image processing model to obtain a predicted common view region, extracts predicted attention center coordinates and a predicted center point offset corresponding to the predicted common view region in the predicted common view region, and determines predicted geometric center coordinates and predicted boundary size information corresponding to the predicted common view region according to the predicted attention center coordinates and the predicted center point offset — 201

The server extracts labeled geometric center coordinates and labeled boundary size information corresponding to a labeled common view region in the labeled common view region of the image sample, calculates cycle consistency loss information corresponding to the preset image processing model based on the predicted geometric center coordinates and the labeled geometric center coordinates, and respectively calculates boundary loss information and average absolute error loss information corresponding to the preset image processing model based on the predicted geometric center coordinates, the predicted boundary size information, the labeled geometric center coordinates, and the labeled boundary size information — 202

The server takes the cycle consistency loss information, the average absolute error loss information, and the boundary loss information as the loss information corresponding to the preset image processing model, and trains the preset image processing model according to the loss information to obtain a trained image processing model — 203

The server acquires a image to be processed pair, performs feature mapping on a image to be processed in the image to be processed pair to obtain a feature map corresponding to the image to be processed, performs dimension reduction processing on the feature map corresponding to the image to be processed to obtain a feature map after dimension reduction, performs multi-scale feature extraction on the feature map after dimension reduction to obtain a scale image feature corresponding to the image to be processed at each scale, and fuses the scale image feature corresponding to the image to be processed at each scale to obtain an image feature of the image to be processed — 204

The server performs flattening processing on the image feature to obtain a flat image feature of the image to be processed, performs feature extraction on the flat image feature to obtain an initial association feature corresponding to each sub-flat image feature in the flat image feature, determines an initial association weight corresponding to each sub-flat image feature in the flat image feature based on the initial association feature, and fuses each sub-flat image feature in the flat image feature according to the initial association weight to obtain an initial attention feature corresponding to the image to be processed — 205

The server performs cross feature extraction on the image feature and the initial attention feature to obtain a cross association feature corresponding to each of the image to be processeds, determines a cross association weight corresponding to the image to be processed according to the cross association feature, and performs weighting on the initial attention feature corresponding to each of the image to be processeds based on the cross association weight to obtain the association feature corresponding to the image to be processed — 206

The server acquires a preset region feature, performs feature extraction on the preset region feature by using the trained image processing model to obtain a region association feature corresponding to each region sub-feature in the preset region feature, determines a region association weight corresponding to each region sub-feature in the preset region feature based on the region association feature, and fuses each region sub-feature in the preset region feature according to the region association weight to obtain an initial region feature — 207

The server performs feature extraction on the initial region feature and the association feature to obtain an image association feature corresponding to the association feature and an initial region association feature corresponding to the initial region feature, determines an image association weight corresponding to the association feature according to the image association feature and the initial region association feature, performs weighting on the association feature based on the image association weight to obtain a common view image feature, and fuses the common view image feature and the initial region feature to obtain a common view region feature — 208

The server calculates a common view weight corresponding to the association feature based on the common view region feature and the association feature, calculates an attention weight of each preset coordinate point in the common view region according to the common view weight and the common view image feature, performs weighting on the preset coordinate point based on the attention weight to obtain a weighted coordinate point, and accumulates the weighted coordinate point to obtain attention center coordinates in the image to be processed — 209

The server performs regression processing on the common view region feature to obtain a relative center point offset corresponding to the common view region, calculates geometric center coordinates and boundary size information of the common view region in the image to be processed according to the attention center coordinates and the relative center point offset, determines a common view region of the image to be processed in the image to be processed based on the geometric center coordinates and the boundary size information, and segments the common view region in the image to be processed to obtain a common view image in the common view region — 210

The server acquires size information of the common view image corresponding to each of the image to be processeds, calculates at least one size difference between the image to be processeds based on the size information, screens out a target size difference satisfying a preset condition from the size difference, takes the target size difference as the scale difference between the common view images, and adjusts the size of the common view image based on the scale difference to obtain an adjusted common view image — 211

The server extracts at least one common view feature point from each adjusted common view image, performs feature point matching on the common view feature point of each of the image to be processeds in the image to be processed pair in the adjusted common view image to obtain a matched common view feature point, determines a source feature point corresponding to the matched common view feature point in the image to be processed based on the scale difference and the size information of the adjusted common view image, and processes the image to be processed based on the source feature point — 212

FIG. 6

COMMON VIEW REGION IDENTIFICATION AND SCALE ALIGNMENT FOR FEATURE MATCHING IN IMAGE PAIRS

RELATED APPLICATIONS

This application is a continuation of PCT Application No. PCT/CN2022/131464, filed on Nov. 11, 2022, which claims priority to Chinese Patent Application No. 2022100889886 filed with the China National Intellectual Property Administration on Jan. 25, 2022 and entitled "IMAGE PROCESSING METHOD AND APPARATUS, AND COMPUTER-READABLE STORAGE MEDIUM." The two applications are both incorporated by reference in their entirety.

FIELD OF THE TECHNOLOGY

This application relates to the field of Internet technologies, and specifically, to an image processing method and apparatus, and a computer-readable storage medium.

BACKGROUND OF THE DISCLOSURE

With the rapid development of Internet technologies, the processing of images is more and more diversified, for example, two corresponding local feature points between two images in different perspectives in the same scenario are matched in an application scenario of large-scale structure from motion (SFM for short). In the existing image processing method, each feature point in the two images is extracted and matched step by step by estimating regions with consistent scale of feature points in the two images.

The method of processing an image by performing single-point matching on the feature points in the images step by step has a low rate of processing the feature points in the images and a low rate of processing the images, thereby leading to low efficiency of image processing.

SUMMARY

According to various embodiments provided by this application, an image processing method and apparatus and a computer-readable storage medium are provided.

One aspect of this application provides an image processing method. The method includes acquiring an image pair to be processed, and performing image feature extraction on an image to be processed in the image pair to be processed to obtain an image; extracting an association feature of the image pair to be processed from the image feature, the association feature characterizing mutual information between images in the image pair to be processed; identifying a common view image of a common view region in the image to be processed according to the association feature, and calculating a scale difference between common view images; adjusting a size of the common view image based on the scale difference to obtain an adjusted common view image; and extracting at least one common view feature point from each of the adjusted common view images, and processing the image pair to be processed based on the common view feature point.

Another aspect of this application further provides a computer device. The computer device includes a memory and a processor. The memory stores computer-readable instruction. The processor implements steps of the above image processing method when executing the computer-readable instruction.

Another aspect of this application further provides a non-transitory computer-readable storage medium. The computer-readable storage medium stores a computer-readable instruction. The computer-readable instruction implements steps of the above image processing method when executed by a processor.

Details of one or more embodiments of this application are provided in the drawings and descriptions below. Other features, objectives, and advantages of this application will become apparent from the specification, the drawings, and the claims.

BRIEF DESCRIPTION OF THE DRAWINGS

To describe the technical solutions in the embodiments of this application or the related technology more clearly, the following briefly describes the drawings required for describing the embodiments or the related technology. Apparently, the drawings in the following descriptions show merely embodiments of this application.

FIG. 2 is a schematic flowchart of an image processing method provided by an embodiment of this application.

FIG. 6 is another schematic flowchart of an image processing method provided by an embodiment of this application.

DESCRIPTION OF EMBODIMENTS

The technical solutions in embodiments of this application are clearly and completely described in the following with reference to the drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Embodiments of this application provide an image processing method and apparatus, and a computer-readable storage medium. The image processing apparatus may be integrated into the computer device. The computer device may be devices such as a server or a terminal.

The server may be an independent physical server, or may also be a server cluster or a distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may include, but is not limited to, a mobile phone, a computer, a smart voice interaction device, a smart home appliance, a vehicle terminal, an aircraft, and the like. The terminal and the server may be directly or indirectly connected in a wired or wireless communication mode. No limits are made thereto in the embodiments of this application.

Figure 1:
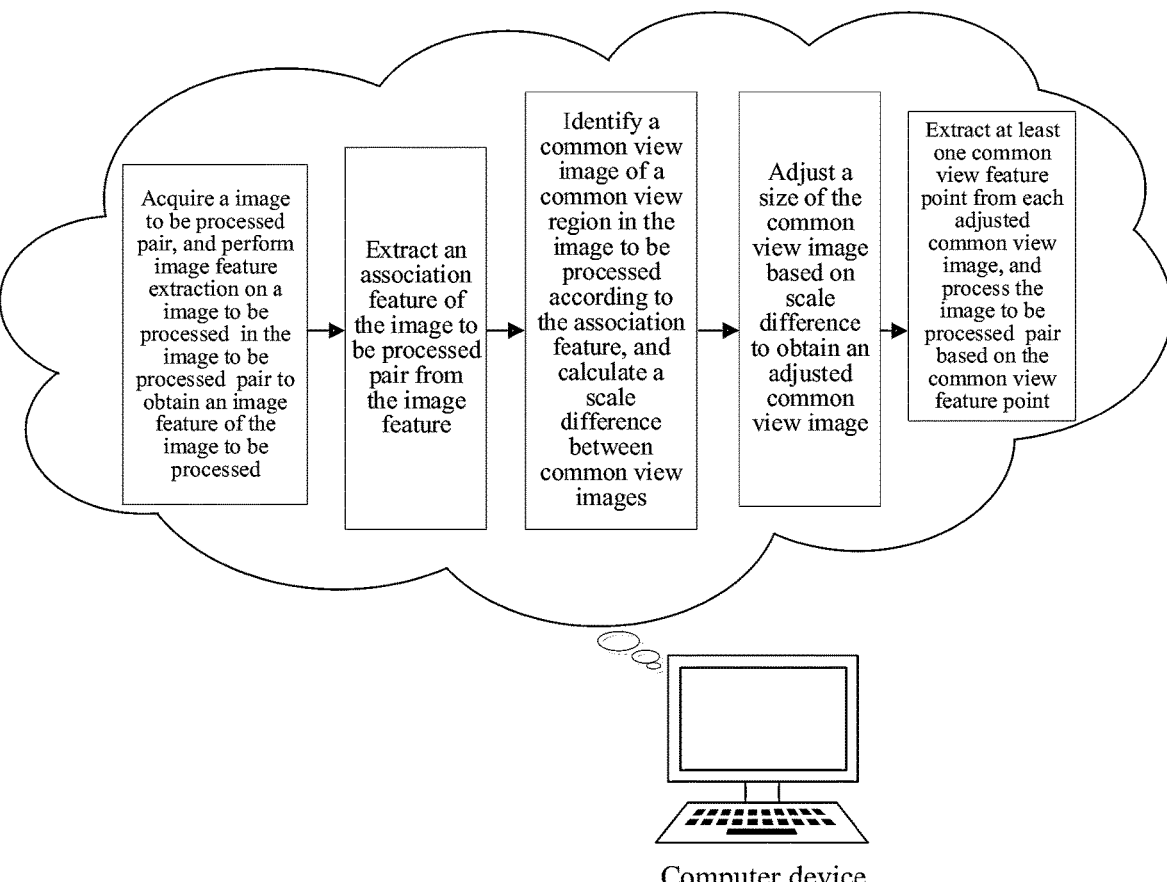
FIG. 1 is a schematic diagram of an implementation scenario of an image processing method provided by an embodiment of this application.

Referring to FIG. 1, taking an image processing apparatus being integrated in a computer device as an example, it is a schematic diagram of an implementation scenario of an image processing method provided by an embodiment of this application. The computer device may be a server, or may also be a terminal. The computer device may acquire an image pair to be processed, and perform image feature extraction on an image to be processed in the image pair to be processed to obtain an image feature of the image to be processed; extract an association feature of the image pair to be processed from the image feature; identify a common view image of a common view region in the image to be processed according to the association feature, and calculate a scale difference between common view images; adjust a size of the common view image based on scale difference to obtain an adjusted common view image; and extract at least one common view feature point from each adjusted common view image, and process the image pair to be processed based on the common view feature point.

Embodiments of this application may be applied to various scenarios, including, but not limited to, cloud technology, artificial intelligence, smart transportation, assisted driving, and the like. The schematic diagram of an implementation environment scenario of the image processing method as shown in FIG. 1 is only an example. The implementation environment scenario of the image processing method described in the embodiment of this application is to describe the technical solution of the embodiment of this application more clearly, and does not constitute a limitation to the technical solution provided by the embodiment of this application. A person of ordinary skill may learn that, with evolution of image processing and appearance of a new service scenario, the technical solution provided by the embodiment of this application is also applicable to a similar technical problem.

To better illustrate the embodiments of this application, please refer to the following terms for reference:

common view region: in a plurality of images captured for the same scenario or the same target object under different shooting conditions, it is an image region where the scenario or the target object is located; the target object may be a living thing or a non-living thing; the living thing refers to an independent living organism, for example, may be any one of natural persons, animals, and plants; the non-living thing refers to various objects, for example, any one of vehicles, buildings, tables, and chairs; and different shooting conditions may be, for example, any one of different perspectives, different distance, or different time. "A plurality of" refers to at least two. For example, when an image A and an image B are obtained by shooting a cat from a left perspective and a right perspective by using a binocular camera, then the regions where the cat is located in the image A and the image B may be common view regions. For another example, in a road reconstruction task, for an image A and an image B obtained by shooting a certain road surface scenario at different time points, the image regions where the road surface scenario is located in the image A and the image B may be common view regions. The shapes of the common view regions may be various shapes as required, for example, may be a rectangle, a square, or a circle.

Feature point: in image processing, a feature point refers to a point where an image gray scale value changes dramatically or a point with a great curvature on an image edge (that is, an intersection point of two edges). A feature point of an image plays an important role in a feature point-based image matching algorithm. The feature point of the image can reflect an essential feature of the image, and can identify a target object in the image. Images can be matched by matching feature points.

Feature matching: a pixel level or sub-pixel level correspondence of images of the same object captured from two different perspectives is obtained.

Scale: it describes the size of an image of an object on a camera plane; the smaller the scale, the smaller the image of the object on the camera plane; and the larger the scale, the larger the image of the object on the camera plane.

The solutions provided by the embodiments of this application relate to technologies such as computer vision of artificial intelligence, and are specifically described by the following embodiments. The description sequences of the following embodiments are not intended to limit preferred sequences of the embodiments.

In one embodiment, refer to FIG. 2, which is a schematic flowchart of an image processing method provided by an embodiment of this application. In this embodiment, the image processing method is performed by a computer device. The computer device may be a server, or may also be a terminal. Specifically, the image processing method includes:

101: Acquire an image pair to be processed, and perform image feature extraction on an image to be processed in the image pair to be processed to obtain an image feature of the image to be processed.

The image pair to be processed may be a whole body composed of a plurality of images to be processed, for example, may be a whole body composed of two images to be processed. The images to be processed in the image pair to be processed may be the images with common view regions, that is, may be two images of the same scenario or the same object shot at different perspectives, different distance, or different times. The image feature may be feature information characterizing an image to be processed.

There may be a plurality of methods of acquiring the image pair to be processed. For example, the image to be processed may be acquired from a memory connected to an image processing apparatus, or may also be acquired from other data storage terminals. The image to be processed may be acquired from a memory of a physical terminal, or may also be acquired from virtual storage space such as a data set or a corpus. No limits are made thereto herein.

Image feature extraction may be performed on an image to be processed in the image pair to be processed after the image pair to be processed is acquired. There may be a plurality of methods of performing image feature extraction on the image to be processed in the image pair to be processed, for example, feature mapping may be performed on the image to be processed in the image pair to be processed to obtain a feature map corresponding to the image to be processed; dimension reduction processing is performed on the feature map corresponding to the image to be processed to obtain a feature map after dimension reduction; multi-scale feature extraction is performed on the feature map after dimension reduction to obtain a scale image feature corresponding to the image to be processed at each scale; and fuse the scale image feature corresponding to the image to be processed at each scale to obtain the image feature of the image to be processed.

The feature map may characterize the feature information of the image to be processed in each channel. In each convolutional layer of a convolutional neural network, data exists in a three-dimensional form, which may be considered as that many two-dimensional pictures are stacked together. Each two-dimensional picture may be referred to as a feature map. The feature map after dimension reduction may be the feature map obtained by performing dimension reduction on the image to be processed. The scale image feature may be the image feature corresponding to each scale obtained after multi-scale feature extraction is performed on the image to be processed.

There may be a plurality of methods of performing feature mapping on the image to be processed in the image pair to be processed. For example, convolutional processing may be performed on the image to be processed by using a convolutional kernel to map a feature of the image to be processed to a feature mapping layer, so as to obtain the feature map corresponding to the image to be processed.

In order to reduce the calculation amount of a model, and meanwhile, to control the size of the model, dimension reduction processing may be performed on the feature map corresponding to the image to be processed after feature mapping is performed on the image to be processed in the image pair to be processed. There may be a plurality of methods of performing dimension reduction on the feature map corresponding to the image to be processed. For example, convolutional processing may be performed on the feature map corresponding to the image to be processed on a channel layer to obtain a feature map after dimension reduction. For example, refer to FIG. 3$a$, which is a schematic diagram of multi-scale feature extraction in an image processing method provided by an embodiment of this application. Assuming that the dimension of the feature map corresponding to the image to be processed is w×h×1024, w represents a width corresponding to the image to be processed, h represents a length corresponding to the image to be processed, and 1024 represents the number of channels corresponding to the feature map. Convolutional processing may be performed on the feature map corresponding to the image to be processed to reduce the number of channels from 1024 to 256 to obtain the dimension corresponding to the feature map after dimension reduction of w×h×256.

Multi-scale feature extraction may be performed on the feature map after dimension reduction after dimension reduction processing is performed on the feature map corresponding to the image to be processed. There may be a plurality of methods of performing multi-scale feature extraction on the feature map after dimension reduction. For example, convolution may be performed on the feature map after dimension reduction by using convolutional kernels with different sizes to obtain scale image features with a plurality of scales, that is, the scale image feature of the image to be processed at each scale may be obtained. For example, please continue to refer to FIG. 3$a$, k represents a convolutional kernel size, and s represents a stride (also referred to as a stride length) of convolution. Therefore, convolution may be performed on the feature map after dimension reduction by using the convolutional kernel size of 4×4 and the stride of 2×2 to obtain the scale image feature, corresponding to the scale, with the dimension of w/2×h/2×256. Meanwhile, convolution may be performed on the feature map after dimension reduction by using the convolutional kernel size of 8×8 and the stride of 2×2 to obtain the scale image feature, corresponding to the scale, with the dimension of w/2×h/2×128. Convolution may also be performed on the feature map after dimension reduction by using the convolutional kernel size of 16×16 and the stride of 2×2 to obtain the scale image feature, corresponding to the scale, with the dimension of w/2×h/2×128. The scale image features corresponding to the three scales may be stitched to obtain a multi-scale image feature with the dimension of w/2×h/2×512.

The scale image feature corresponding to the image to be processed at each scale may be fused after multi-scale feature extraction is performed on the feature map after dimension reduction. There may be a plurality of methods of fusing the scale image feature corresponding to the images to be processed at each scale. For example, please continue to refer to FIG. 3$a$, the scale image feature corresponding to each scale may be fused on a channel layer to obtain the image feature, corresponding to the image to be processed, with the dimension of w/2×h/2×256.

Figure 3A:
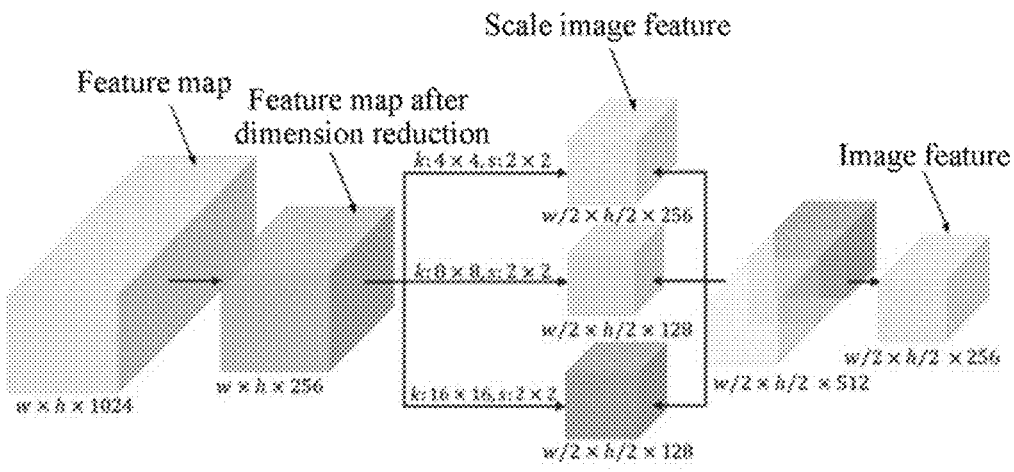
FIG. 3a is a schematic diagram of multi-scale feature extraction in an image processing method provided by an embodiment of this application.

In one embodiment, refer to FIG. 3$b$, which is a specific schematic flowchart of an image processing method provided by an embodiment of this application. Steps indicated by solid line arrows represent steps belonging to model training and application stages, and steps indicated by dashed arrows represent steps only belonging to a model training stage. It may be assumed that the image pair to be processed includes images to be processed Ia and Ib, the length is H, and the width is W (that is, H×W). Down-sampling is performed on the images to be processed Ia and Ib through a residual network (Resnet50), for example, 8× feature maps may be down-sampled from the images to be processed Ia and Ib by using Resnet50-Layer3 (Shared Layer3, that is, a third layer structure in Resnet50), and the number of channels may be 1024, so that the dimension corresponding to the feature maps after dimension reduction may be W/16×H/16×256, and the feature maps after dimension reduction corresponding to the images to be processed Ia and Ib may be respectively input into a multi-scale feature extractor to perform multi-scale feature extraction and fusion to obtain an image feature, corresponding to the images to be processed Ia and Ib, with the dimension of W/32×H/32×256.

102: Extract an association feature of the image pair to be processed from the image feature.

The association feature may be used for characterizing mutual information between images to be processed in the image pair to be processed. The mutual information may be the information characterizing an association relationship between the images to be processed, for example, the information that may characterize that there is the same scenario or object in the images to be processed. The association feature may be a feature map, for example, the dimension of the feature map may be 256 dimensions, which may be represented as $F \in R^{h \times w \times 256}$.

There may be a plurality of methods of extracting an association feature of the image pair to be processed from the image feature. For example, flattening processing may be performed on the image feature to obtain a flat image feature of the image to be processed, feature extraction may be performed on the flat image feature to obtain an initial attention feature corresponding to the image to be processed, and cross feature extraction may be performed on the initial attention feature to obtain the association feature of each of the images to be processed in the image pair to be processed.

The flat image feature may be the feature obtained by flattening the image feature corresponding to the image to be processed. The initial attention feature may be understood as a feature used for characterizing an association relationship between each feature in the image feature and another feature in the image feature corresponding to the image to be processed.

There may be a plurality of methods of performing flattening processing on the image feature. For example, flattening processing may be performed on the image feature by using a flatten layer to flatten the image feature with the dimension of $w/2 \times h/2 \times 256$ to obtain a one-dimensional flat image feature corresponding to the image to be processed.

Feature extraction may be performed on the flat image feature to obtain an initial attention feature corresponding to the image to be processed after flattening processing is performed on the image feature. There may be a plurality of methods of performing feature extraction on the flat image feature. For example, the flat image feature may include a plurality of sub-flat image features; feature extraction may be performed on the flat image feature to obtain an initial association feature corresponding to each sub-flat image feature in the flat image feature; an initial association weight corresponding to each sub-flat image feature in the flat image feature may be determined based on the initial association feature; and each sub-flat image feature in the flat image feature may be fused according to the initial association weight to obtain an initial attention feature corresponding to the image to be processed.

The sub-flat image feature may be at least one feature in the flat image feature, for example, the flat image feature may be divided into a plurality of regions, and the feature corresponding to each region is a sub-flat image feature. Performing feature extraction on the flat image feature is a process of performing feature mapping on the sub-flat image feature in the flat image feature. The feature obtained by mapping is an initial association feature corresponding to the sub-flat image feature. The initial association feature may be feature information used for determining an association relationship between the sub-flat image feature and another sub-flat image feature. The initial association weight may characterize an importance degree of each sub-flat image feature of the flat image feature in the flat image feature.

There may be a plurality of methods of performing feature extraction on the flat image feature to obtain the initial association feature corresponding to each sub-flat image feature of the flat image feature. For example, feature extraction may be performed on the flat image feature by using an attention network to obtain the initial association feature corresponding to each sub-flat image feature in the flat image feature. For example, each flat image feature may be transformed into spatial vectors in three dimensions, including a query vector (called Q for short), a key vector (called K for short), and a value vector (called V for short). A specific transformation manner may be understood as fusing each flat image feature and transformation parameters in three dimensions, and the query vector, the key vector, and the value vector are taken as the initial association feature corresponding to each flat image feature.

The initial association weight corresponding to each sub-flat image feature in the flat image feature may be determined based on the initial association feature after feature extraction is performed on the flat image feature to obtain the initial association feature corresponding to each sub-flat image feature in the flat image feature. There may be a plurality of methods of determining the initial association weight corresponding to each sub-flat image feature in the flat image feature based on the initial association feature, for example, dot product may be performed on the query vector corresponding to each sub-flat image feature in the flat image feature and the key vector of another flat image feature by using an attention network to obtain an attention score corresponding to each sub-flat image feature, and the initial association weight corresponding to each sub-flat image feature is calculated based on the attention score corresponding to each sub-flat image feature.

In addition to determining the initial association feature corresponding to each sub-flat image feature in the flat image feature based on the initial association feature after feature extraction is performed on the flat image feature by using the attention network to obtain the initial association feature corresponding to each sub-flat image feature in the flat image feature, the association relationship between each sub-flat image feature and another sub-flat image feature may also be captured in other manners, so as to determine a network of a weight of each sub-flat image feature in the flat image feature.

All sub-flat image features in the flat image feature may be fused according to the initial association weight after the initial association weight corresponding to each sub-flat image feature in the flat image feature is determined based on the initial association feature. There may be a plurality of methods of fusing all sub-flat image features in the flat image feature according to the initial association weight. For example, weighting is performed on each sub-flat image feature in the flat image feature based on the initial association weight, weighted sub-flat image features are accumulated, and the initial attention feature corresponding to the image to be processed may be obtained according to an accumulated result. For example, assuming that the image pair to be processed includes an image to be processed A and an image to be processed B. The flat image feature corresponding to the image to be processed A includes 4 sub-flat image features, which are respectively G, B, C, and D, initial association weights corresponding to all sub-flat image features are determined, which are respectively g, b, c, and d, and then weighting may be performed on all sub-flat image features in the flat image feature based on the initial association weights to obtain Gg, Bb, Cc, and Dd, so that the weighted sub-flat image features may be accumulated to obtain an accumulated result Gg+Bb+Cc+Dd, and the initial attention feature Gg+Bb+Cc+Dd corresponding to the image to be processed may be performed according to the accumulated result.

Figure 3B:
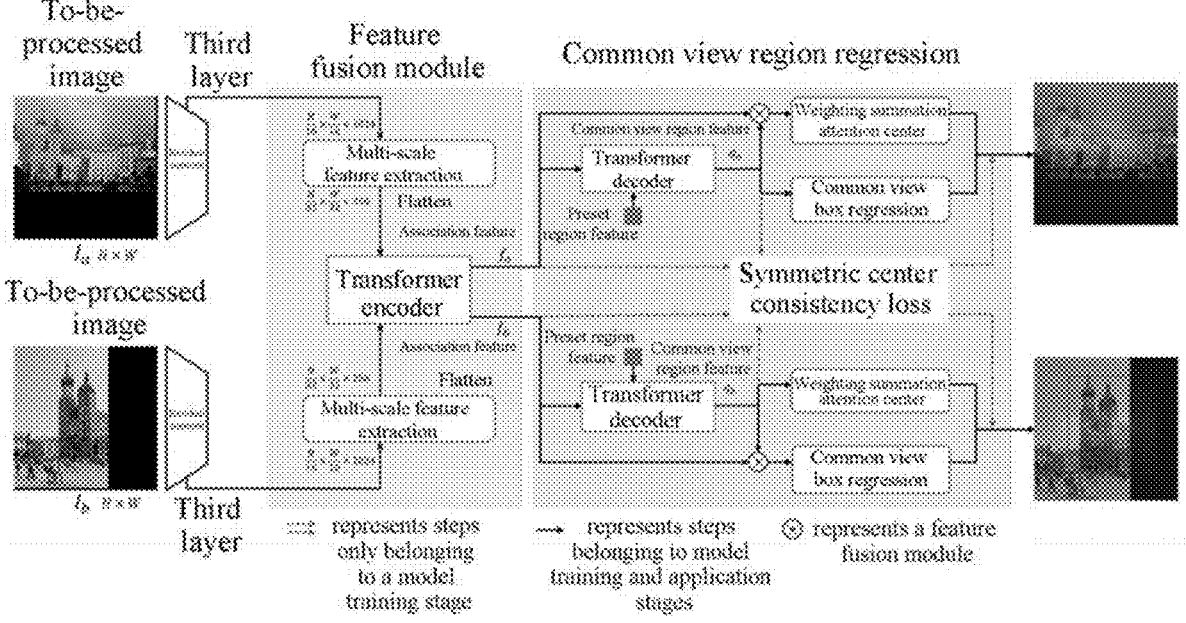
FIG. 3b is a specific schematic flowchart of an image processing method provided by an embodiment of this application.

In one embodiment, referring to FIG. 3b, the flat image feature may be input into a transformer encoder to obtain the initial attention feature corresponding to the image to be processed. In some embodiments, refer to FIG. 4a, which is a schematic structural diagram of an image processing model in an image processing method provided by the embodiment of this application. Assuming that the image pair to be processed includes images to be processed Ia and Ib, taking acquiring an initial attention feature corresponding to the image to be processed Ia as an example, the flat image feature Îa corresponding to the image to be processed Ia may be input into a self-attention sub-module of the transformer encoder on the left side in the figure to obtain the initial attention feature corresponding to the image to be processed. Specifically, the flat image feature Îa corresponding to the image to be processed may be transformed into spatial vectors in three dimensions, namely, K, Q, and V, and the spatial vectors are input into the self-attention sub-module of the transformer encoder. In the self-attention sub-module, a multi-head attention unit performs feature extraction on the flat image feature to obtain the initial association weight corresponding to each sub-flat image feature in the flat image feature, and performs weighting and concatenating on each sub-flat image feature in the flat image feature according to the initial association weight to obtain an output of the multi-head attention unit and then concatenate the output of the multi-head attention unit and the flat image feature f a through a concat unit; and then, normalization processing may be performed on the concatenated result through a normalization unit (layer normalization), so that full connection processing may be performed on a normalization processing result through a feed forward network sub-unit in a feed forward network and residual connection unit (FeedForward&Add), and residual connection processing may be performed on a full connection processing result and a concatenated result through the residual connection unit (Add) in the feed forward network and residual connection unit (FeedForward&Add) to obtain the initial attention feature corresponding to the image to be processed Ia.

Cross feature extraction may be performed on the initial attention feature to obtain the association feature of each of the images to be processed in the image pair to be processed after feature extraction is performed on the flat image feature to obtain the initial attention feature corresponding to the image to be processed. There may be a plurality of methods of performing cross feature extraction on the initial attention feature. For example, cross feature extraction may be performed on the image feature and the initial attention feature to obtain a cross association feature corresponding to each of the images to be processed, a cross association weight corresponding to the image to be processed may be determined according to the cross association feature, and weighting may be performed on the initial attention feature corresponding to each of the images to be processed based on the cross association weight to obtain the association feature corresponding to the image to be processed.

The cross association feature may be a feature used for determining an association relationship between images to be processed in the image pair to be processed. The cross association weight may characterize an association degree between images to be processed in the image pair to be processed. The image feature may be the image feature after flattening processing, that is, a flat image feature.

There may be a plurality of methods of performing cross feature extraction on the image feature and the initial attention feature to obtain the cross association feature corresponding to each of the images to be processed. For example, cross feature extraction may be performed on the image feature and the initial attention feature by using an attention network. For example, cross feature extraction may be performed on the image feature and the initial attention feature by using the attention network. For example, the initial attention feature corresponding to a certain image to be processed may be transformed into a query vector, and the image feature of the other image to be processed may be transformed into a key vector and a value vector (the image feature may be transformed into the flat image feature). A specific transformation manner may be understood as fusing the image feature, the initial attention feature, and the transformation parameter in the corresponding dimension, and the corresponding query vector, the key vector, and the value vector are taken as the cross association feature of each image feature.

The cross association weight corresponding to the image to be processed may be determined according to the cross association feature after cross feature extraction is performed on the image feature and the initial attention feature to obtain the cross association feature corresponding to each of the images to be processed. There may be a plurality of methods of determining the cross association weight corresponding to the image to be processed according to the cross association feature. For example, dot product may be performed on the query vector corresponding to the initial attention feature corresponding to a certain image to be processed in the image pair to be processed and the key vectors of the image features corresponding to the other images to be processed by using an attention network, attention scores of the image feature corresponding to the certain image to be processed in the image pair to be processed and the corresponding initial attention feature, and the cross association weight of each image feature and the corresponding initial attention feature is calculated based on the attention scores.

Weighting may be performed on the initial attention feature corresponding to each of the images to be processed based on the cross association weight to obtain an association feature corresponding to the image to be processed after the cross association weight corresponding to the image to be processed is determined according to the cross association feature. There may be a plurality of methods of performing weighting on the initial attention feature corresponding to each of the images to be processed based on the cross association weight. For example, assuming that the image pair to be processed includes an image to be processed A and an image to be processed B, taking acquiring an association feature corresponding to the image to be processed A as an example, assuming that the initial attention feature corresponding to the image to be processed A is E, the image feature corresponding to the image to be processed B is f̄f, the cross association weight corresponding to the initial attention feature E is determined as e, the cross association weight corresponding to the image feature f̄f is determined as f, and then the initial attention feature E and the image feature f̄f may be fused based on the cross association weight to obtain the association feature. For example, weighting and summation may be performed on the initial attention feature E and the image feature f̄f based on the cross association weight to obtain the association feature eE+f*f̄f.

Figure 4A:
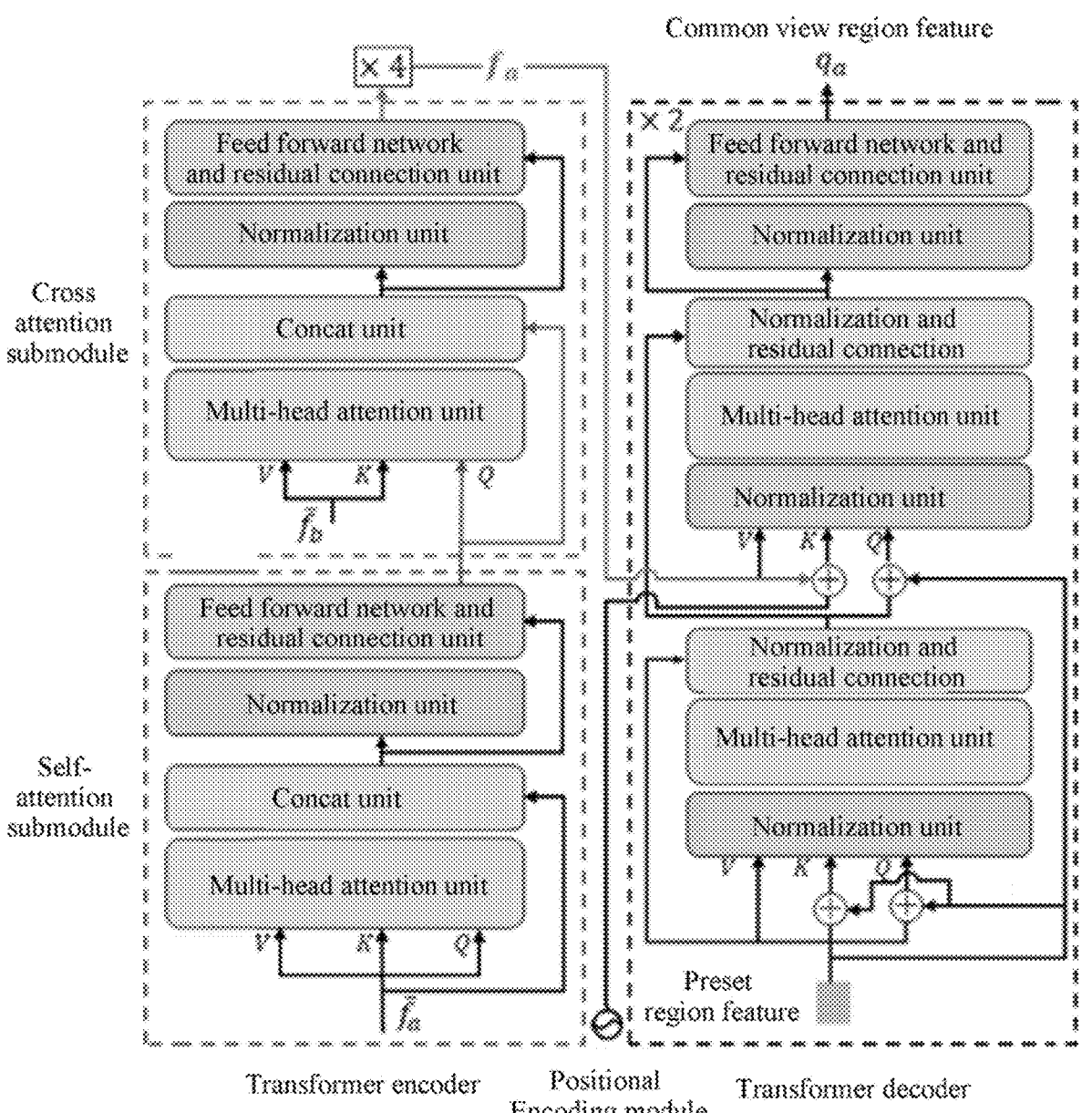
FIG. 4a is a schematic structural diagram of an image processing model in an image processing method provided by an embodiment of this application.

In one embodiment, referring to FIG. 4a, assuming that the image pair to be processed includes images to be processed Ia and Ib, taking acquiring an association feature corresponding to the image to be processed Ia as an example, the flat image feature f̄a corresponding to the image to be processed Ia may be input into a self-attention sub-module of the transformer encoder on the left side in the figure to obtain the initial attention feature corresponding to the image to be processed, and the initial attention feature is input into the cross attention sub-module of the transformer encoder. Specifically, the initial attention feature corresponding to the image to be processed Ia may be transformed into a query vector Q, the flat image feature f̄b corresponding to the image to be processed Ib is transformed into a key vector K and a value vector V, and then the vectors may be input into the multi-head attention unit of the cross attention sub-module. The multi-head attention unit performs cross feature extraction on the image feature and the initial attention feature to obtain a cross association feature corresponding to each of the images to be processed. The cross association weight corresponding to the image to be processed is determined according to the cross association feature. Weighting and concatenating processing is performed on the initial attention feature corresponding to the image to be processed Ia and the flat image feature Ib corresponding to the image to be processed Ib based on the cross association weight to obtain the output of the multi-head attention unit. Then, the concat unit may concatenate the output of the multi-head attention unit and the initial attention feature corresponding to the image to be processed, and perform normalization processing on the concatenated result through a normalization unit, so that full connection processing may be performed on a normalization processing result through the feed forward network sub-unit in the feed forward network and residual connection unit (FeedForward&Add) to obtain the association feature corresponding to the image to be processed Ia.

Similarly, the association feature corresponding to the image to be processed Ib may be acquired by using a method for acquiring the association feature corresponding to the image to be processed Ia. Details are not described herein again.

103: Identify common view images of common view regions in the images to be processed according to the association feature, and calculate a scale difference between the common view images.

The common view image may be a region image where a common view region is located in each image to be processed. The scale difference may be a numerical value characterizing the scale difference between the common view images in the images to be processed.

There may be a plurality of methods of identifying the common view image of the common view region in the image to be processed according to the association feature. For example, a preset region feature may be acquired, and feature extraction may be performed on the preset region feature by using a trained image processing model to obtain an initial region feature. Cross feature extraction may be performed on the initial region feature and the association feature to obtain a common view region feature corresponding to the initial region feature. The common view image in the common view region in the image to be processed is identified based on the common view region feature and the association feature.

The preset region feature may be preset feature information of a bounding box of the common view region, which may be understood as an abstract expression of the information learned in advance for detecting the bounding box of the common view region. The preset region feature may be a 256-dimensional feature vector ($Q \in R^{1 \times 256}$). The initial region feature may be the feature information obtained by fusing based on the association relationship between every two features in the preset region features. The common view region feature may be feature information characterizing a bounding box corresponding to the common view region in the image to be processed. The trained image processing model may be a trained model configured to process the images to be processed in the image pair to be processed, and may be a transformer model. A specific structure of the trained image processing model may refer to a schematic structural diagram of an image processing model provided by FIG. 4a.

There may be a plurality of methods of acquiring the preset region feature. For example, the preset region feature may be designed and input in advance by a developer, or may also be directly and automatically generated according to a region feature template acquired in advance.

Feature extraction may be performed on the preset region feature by using the trained image processing model to obtain an initial region feature after the preset region feature is acquired. There may be a plurality of methods of performing feature extraction on the preset region feature by using the trained image processing model. For example, the preset region feature may include a plurality of region sub-features; feature extraction may be performed on the preset region feature by using the trained image processing model to obtain a region association feature corresponding to each region sub-feature in the preset region feature; a region association weight corresponding to each region sub-feature in the preset region feature is determined based on the region association feature; and each region sub-feature in the preset region feature is fused according to the region association weight to obtain the initial region feature.

The region sub-feature may be at least one feature in the preset region feature, for example, the preset region feature may be divided into a plurality of regions, and the feature corresponding to each region is a region sub-feature. Feature extraction is performed on the preset region feature, that is, feature mapping is performed on the region sub-feature in the preset region feature. The feature obtained by mapping is a region association feature corresponding to the region sub-feature. The region association feature may be feature information used for determining an association relationship between the region sub-feature and another region sub-feature. The region association weight may characterize an importance degree of each region sub-feature of the preset region feature in the preset region feature.

There may be a plurality of methods of performing feature extraction on the preset region feature by using the trained image processing model to obtain the region association feature corresponding to each region sub-feature of the preset region feature. For example, feature extraction may be performed on the preset region feature by using an attention network to obtain the region association feature corresponding to each region sub-feature of the preset region feature. For example, each region sub-feature may be transformed into spatial vectors in three dimensions, including a query vector, a key vector, and a value vector. A specific transformation manner may be understood as fusing each region sub-feature and transformation parameters in three dimensions, and the query vector, the key vector, and the value vector are taken as the region association feature corresponding to each region sub-feature.

The region association weight corresponding to each region sub-feature in the preset region feature may be determined based on the region association feature after feature extraction is performed on the preset region feature by using the trained image processing model to obtain the region association feature corresponding to each region sub-feature in the preset region feature. There may be a plurality of methods of determining the region association weight corresponding to each region sub-feature in the preset region feature based on the region association feature, for example, dot product may be performed on the query vector corresponding to each region sub-feature in the preset region feature and the key vector of another region sub-feature by using an attention network to obtain an attention score corresponding to each region sub-feature, and the region association weight corresponding to each region sub-feature is calculated based on the attention score corresponding to each region sub-feature.

All region sub-features in the preset region feature may be fused according to the region association weight after the region association weight corresponding to each region sub-feature in the preset region feature is determined based on the region association feature. There may be a plurality of methods of fusing each region sub-feature in the preset region feature according to the region association weight. For example, weighting is performed on each region sub-feature in the preset region feature based on the region association weight, weighted region sub-features are accumulated, and the initial region feature corresponding to the preset region feature may be obtained according to an accumulated result.

In one embodiment, continuing to refer to FIG. 4a, feature extraction may be performed on the preset region feature by using a transformer decoder in the trained image processing model on the right side of the figure to obtain a region association feature corresponding to each region sub-feature in the preset region feature. Specifically, assuming that the image pair to be processed includes images to be processed Ia and Ib, taking acquiring a region association feature corresponding to the image to be processed Ia as an example, a preset region feature (Single Query) may be transformed into spatial vectors in three dimensions, namely, K, Q, and V, and the spatial vectors are input into a normalization unit of the transformer decoder to perform normalization processing. The spatial vectors, namely, K, Q, and V, after normalization processing are into a multi-head self-attention unit. The multi-head self-attention unit performs feature extraction on the preset region feature to obtain the region association feature corresponding to each region sub-feature in the preset region feature. The region association weight corresponding to each region sub-feature in the preset region feature is determined based on the region association feature, and then weighting is performs on each region sub-feature in the preset region feature, so that a weighted result is input into a regularization and residual connection unit (Dropout&Add) to perform feature fusion to obtain the initial region feature corresponding to the image to be processed Ia.

Cross feature extraction may be performed on the initial region feature and the association feature after feature extraction is performed on the preset region feature by using the trained image processing model to obtain the initial region feature. There may be a plurality of methods of performing cross feature extraction on the initial region feature and the association feature. For example, feature extraction may be performed on the initial region feature and the association feature to obtain the image association feature corresponding to the association feature and the initial region association feature corresponding to the initial region feature. An image association weight corresponding to the association feature is determined according to the image association feature and the initial region association feature. Weighting is performed on the association feature based on the image association weight to obtain a common view image feature, and the common view image feature and the initial region feature are fused to obtain a common view region feature.

Feature mapping is performed on the association feature, that is, feature mapping is performed on the association feature. The feature obtained by mapping is the image association feature corresponding to the association feature. The image association feature may be feature information used for determining an association relationship between the association feature and the initial region feature. Feature extraction is performed on the initial region feature, that is, feature mapping is performed on the initial region feature. The feature obtained by mapping is the initial region association feature corresponding to the initial region feature.

The initial region association feature may be feature information used for determining an association relationship between the initial region feature and the association feature. The image association weight may characterize the association degree between the association feature and the initial region feature. The common view image feature may be feature information characterizing the association relationship between the association feature and the initial region feature.

There may be a plurality of methods of performing feature extraction on the initial region feature and the association feature to obtain the image association feature corresponding to the association feature and the initial region association feature corresponding to the initial region feature. For example, feature extraction may be performed on the initial region feature and the association feature by using an attention network. For example, the initial region feature corresponding to a certain image to be processed may be transformed into a query vector, and the corresponding association feature may be transformed into a key vector and a value vector. A specific transformation manner may be understood as fusing the initial region feature, the association feature, and the transformation parameter in the corresponding dimension, the corresponding query vector is taken as the initial region association feature corresponding to the initial region feature, and the corresponding key vector and value vector are taken as the image association feature corresponding to the association feature.

The image association weight corresponding to the association feature may be determined according to the image association feature and the initial region association feature after feature extraction is performed on the initial region feature and the association feature to obtain the image association feature corresponding to the association feature and the initial region association feature corresponding to the initial region feature. There may be a plurality of methods of determining the image association weight corresponding to the association feature according to the image association feature and the initial region association feature. For example, dot product may be performed on the query vector corresponding to the image association feature corresponding to the association feature and the initial region association feature corresponding to the initial region feature by using an attention network, and an attention score of each feature in the association feature may be obtained. An image association weight of the association feature corresponding to the image to be processed is calculated based on the attention score.

Weighting may be performed on the association feature based on the image association weight after the image association weight corresponding to the association feature is determined according to the image association feature and initial region association feature. There may be a plurality of methods of performing weighting on the association feature based on the image association weight. For example, weighting may be performed on the value vector in the image association feature corresponding to the association feature according to the image association weight, and the weighted value vector is fused to obtain a common view image feature.

The common view image feature and the initial region feature are fused to obtain a common view region feature after weighting is performed on the association feature based on the image association weight. There may be a plurality of methods of fusing the common view image feature and the initial region feature. For example, referring to FIG. 4a, assuming that the image pair to be processed includes images to be processed Ia and Ib, taking acquiring the common view region feature corresponding to the image to be processed Ia as an example, the association feature fa corresponding to the image to be processed Ia may be input into transformer decoder on the right side of the figure to obtain the common view region feature corresponding to the image to be processed Ia. Specifically, feature extraction may be performed on the initial region feature and the association feature. For example, weighting may be performed on the initial region feature corresponding to the image to be processed Ia and the corresponding preset region feature, a weighted result is transformed into a query vector Q, that is, the initial region association feature, the association feature fa corresponding to the image to be processed Ia is transformed into a value vector V, positional encoding is performed on the association feature through a positional encoding module, and a positional encoding result corresponding to fa is transformed into a key vector K. The image association feature corresponding to the association feature may be obtained based on the value vector V and the key vector K, then normalization processing may be performed on the image association feature and the initial region association feature through a normalization unit, and a normalization processing unit is input into a multi-head attention unit. The multi-head attention unit determines the image association weight corresponding to the association feature according to the image association feature and the initial region association feature, and performs weighting on the association feature based on the image association weight to obtain the common view image feature to obtain an output of the multi-head attention unit. Then, regularization processing may be performed on the output of the multi-head attention unit through the regularization and residual connection unit, and then residual connection processing may be performed on a regularization processing result and the initial region feature. Next, normalization processing may be performed on a residual connection processing result through a normalization unit. Full connection processing may be performed on a normalization processing result through a feed forward network sub-unit in a feed forward network and residual connection unit (FeedForward&Add), and residual connection processing may be performed on the full connection processing result and the residual connection processing result in the feed forward network and residual connection unit (FeedForward&Add) through the residual connection sub-unit in the feed forward network and residual connection unit (FeedForward&Add) to obtain a common view region feature qa corresponding to the image to be processed Ia.

Similarly, the common view region feature corresponding to the image to be processed Ib may be acquired by using a method for acquiring the common view region feature corresponding to the image to be processed Ia. Details are not described herein again.

A common view image in the common view region may be identified in the image to be processed based on the common view region feature and the association feature after cross feature extraction is performed on the initial region feature and the association feature. There may be a plurality of methods of identifying the common view image in the common view region in the image to be processed based on the common view region feature and the association feature. For example, a common view weight corresponding to the association feature may be calculated based on the common view region feature and the association feature. Center of attention coordinates are determined in the image to be processed according to the common view weight and the association feature. Regression processing is performed on the common view region feature to obtain a relative center point offset corresponding to the common view region. The common view image in the common view region is identified in the image to be processed according to the center of attention coordinates and the relative center point offset.

The common view weight (Attention Map) may represent the importance degree of the feature at each position in the association feature in the association feature. The center of attention coordinates may be the coordinates of a center with high importance degree in the common view region based on the common view weight, and may be understood as an center of attention of the common view region. The relative center point offset may be an offset distance of the center of attention coordinates relative to the bounding box of the common view region. A rectangular box may be determined according to the center of attention coordinates and the corresponding relative center point offset, that is, the common view region may be determined.

There may be a plurality of methods of calculating the common view weight corresponding to the association feature based on the common view region feature and the association feature. For example, a dot product (also referred to as scalar product) operation may be performed on the common view region feature corresponding to the image to be processed and the association feature to obtain the common view weight according to an operation result. In some embodiments, the common view weight may be represented as:

$$A=dot(Q,F)\in R^{h\times w}$$

A represents the common view weight corresponding to the image to be processed, dot ( ) represents a dot product operation function, Q represents the association feature, F represents the common view region feature, R represents a dimension, h represents the distribution length h of the common view weight, and w represents the distribution length w of the common view weight.

The center of attention coordinates may be determined in the image to be processed according to the common view weight and the association feature after the common view weight corresponding to the association feature is calculated based on the common view region feature and the association feature. There may be a plurality of methods of determining the center of attention coordinates in the image to be processed according to the common view weight and the association feature. For example, the attention weight of each preset coordinate point in the common view region may be calculated according to the common view weight and the association feature. Weighting may be performed on the preset coordinate point based on the attention weight to obtain a weighted coordinate point, and weighted coordinate points are accumulated to obtain the center of attention coordinates in the image to be processed.

The attention weight may characterize the attention degree of each preset coordinate point in the common view region, which may be understood as characterizing the probability that each preset coordinate point in the common view region is a geometric center point in the common view region. The preset coordinate point may be a coordinate point in a preset relative coordinate map. For example, an image with a size of w*h may be divided into a plurality of 1*1 coordinate grids, then a relative coordinate map may be obtained. The coordinates of each grid in the relative coordinate map are the coordinates of the preset coordinate point.

The weighted coordinate point may be a coordinate point weighted based on the attention weight.

There may be a plurality of methods of calculating the attention weight of each preset coordinate point in the common view region according to the common view weight and the association feature. For example, continuing to refer to FIG. 3*b*, the attention weight of each preset coordinate point in the common view region may be calculated through a feature fusion module and a weighting summation center of attention module (WS-Centerness) to obtain the center of attention coordinates of the common view region. Specifically, The association feature may be transformed in a form of a feature map, so that a cross multiplication operation may be performed on the common view weight and the association feature, that is, A×F. Residual connection processing is performed on a cross multiplication operation result and the association feature to obtain a residual connection processing result A×F+F, and then convolution is performed on the residual connection processing result A×F+F through a fully convolution network (FCN) to generate a common view region probability map P, that is, center coordinate probability distribution Pc(x, y) in the common view region, which may be used for characterizing the attention weight corresponding to each preset coordinate point in the common view region. The common view region probability map P may be represented as $$P=\text{softmax}(\text{conv}_{3\times3}(A\times F+F))$$

Where × represents the cross multiplication operation, + represents the residual connection processing, softmax ( ) represents a logic regression function, and $\text{conv}_{3\times3}$ represents the convolutional processing with the convolutional kernel of 3×3.

Weighting may be performed on the preset coordinate point based on the attention weight to obtain a weighted coordinate point after the attention weight of each preset coordinate point in the common view region is calculated according to the common view weight and the association feature, and weighted coordinate points are accumulated to obtain the center of attention coordinates in the image to be processed. There may be a plurality of methods of performing weighting and summation on the preset coordinate point based on the attention weight. For example, weighting and summation may be performed on the center coordinate probability distribution Pc(x, y) in the common view region and the preset coordinate point corresponding to the relative coordinate map to obtain the center of attention coordinates of the common view region, which may be represented as $$(\hat{x}_c,\hat{y}_c)=(\Sigma_{y=0}^{H}\Sigma_{x=0}^{W}x{\cdot}P_c(x,y),\Sigma_{y=0}^{H}\Sigma_{x=0}^{W}y{\cdot}P_c(x,y))$$

Where $\hat{x}_c$ represents a horizontal coordinate of the center of attention coordinates, $\hat{y}_c$ represents a vertical coordinate of the center of attention coordinates, H represents the length of the image to be processed, W represents the width of the image to be processed, x represents the horizontal coordinate in the relative coordinate map, y represents the vertical coordinate in the relative coordinate map, and Σ represents a summation symbol.

Figure 4B:
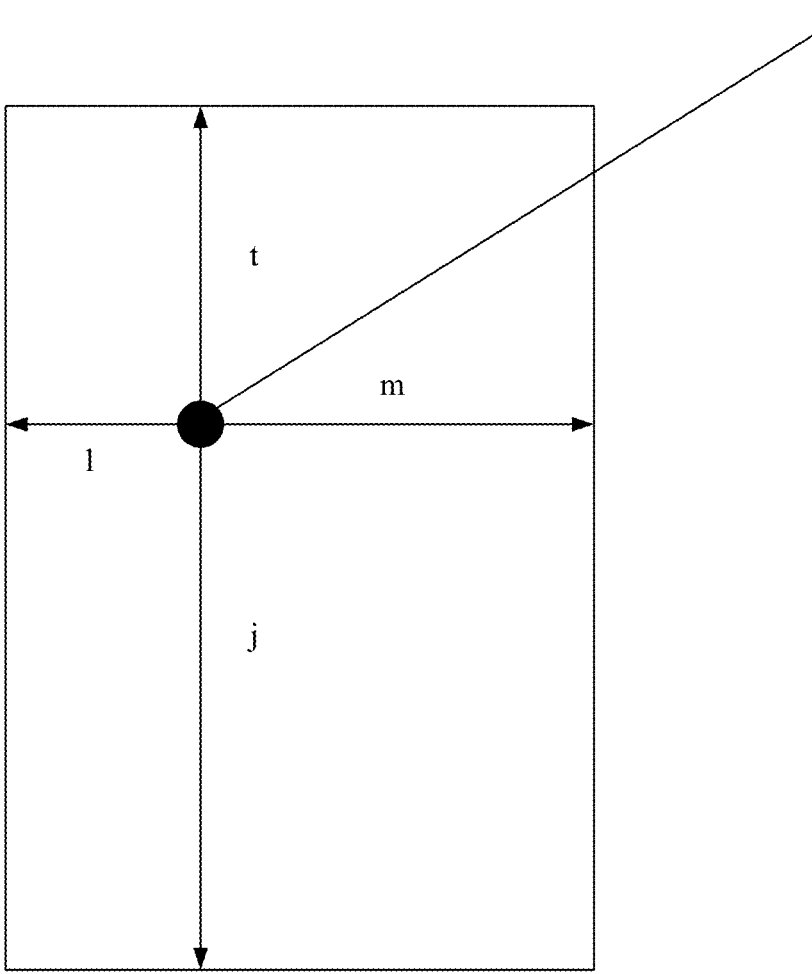
FIG. 4b is a schematic diagram of center of attention coordinates and a relative center point offset in an image processing method provided by an embodiment of this application.

Regression processing may be performed on the common view region feature to obtain a relative center point offset corresponding to the common view region after the center of attention coordinates are determined in the image to be processed according to the common view weight and the association feature. There may be a plurality of methods of performing regression processing on the common view region feature. For example, continuing to refer to FIG. 3*b*, regression processing may be performed on the common view region feature through a common view box regression module. Specifically, It may be assumed that the common view region feature may be a 256-dimensional vector, full connection processing may be performed on the common view region feature through a fully connected layer, and then a full connection processing result may be activated through an activation function (a linear rectification function, a ReLU function), so that the full connection processing may be performed on an activation result through the fully connected layer to obtain a 4-dimensional vector corresponding to the common view region feature. Then, a normalized center point offset (L, T, M, J) may be obtained through an activation function (Sigmoid), finally, L and M are multiplied by the width W of the image to be processed, and the L and J are multiplied by the length H of the image to be processed to obtain the relative center point offset (l, t, m, j), for example, refer to FIG. 4*b*, which is a schematic diagram of center of attention coordinates and the relative center point offset in an image processing method provided by an embodiment of this application.

The common view image in the common view region may be identified in the images to be processed according to the center of attention coordinates and the relative center point offset after regression processing is performed on the common view region feature. There may be a plurality of methods of identifying the common view image in the common view region in the image to be processed according to the center of attention coordinates and the relative center point offset. For example, geometric center coordinates and boundary size information of the common view region in the image to be processed may be calculated according to the center of attention coordinates and the relative center point offset; the common view region of the image to be processed is determined in the image to be processed based on the geometric center coordinates and the boundary size information; and the common view region is segmented in the image to be processed to obtain the common view image in the common view region.

The geometric center coordinates may be the coordinates of a geometric center of a rectangular box corresponding to the common view region, and the boundary size information may be the information of the size of the side length of the rectangular box corresponding to the common view region.

There may be a plurality of methods of calculating the geometric center coordinates and the boundary size information of the common view region in the image to be processed according to the center of attention coordinates and the relative center point offset. For example, continuing to refer to FIG. 4*b*, assuming that the center of attention coordinates are $(x_c, y_c)$, and the relative center point offset is (l, t, m, j), meanwhile, assuming that j is greater than t, m is greater than l, and the common view region is located in a first quadrant in the relative coordinate map, then the horizontal coordinate of the geometric center coordinates may be calculated as $[(l+m)/2]-l+x_c$, the vertical coordinate of the geometric center coordinates may be calculated as $[(t+j)/2]+y_c-j$, that is, the geometric center coordinates are $([(l+m)/2]-l+x_c, [(t+j)/2]+y_c-j)$, the length of the boundary size information of the rectangular box corresponding to the common view region may be calculated as t+j, and the width may be calculated as l+m.

In one embodiment, an image processing model may be trained to obtain a trained image processing model. There may be a plurality of methods of training the image processing model. For example, continuing to refer to FIG. 3*b*, the image processing model may be trained through a symmetric center consistency loss. Specifically, an image sample pair may be acquired, and a common view region of each image sample in the image sample pair may be predicted by using a preset image processing model to obtain a predicted common view region. The preset image processing model is trained according to a labeled common view region and the predicted common view region to obtain a trained image processing model.

The image sample pair may be image pair samples used for training the preset image processing model. The image sample in the image sample pair includes a labeled common view region. The preset image processing model may be a pre-trained image processing model that has not been trained. The predicted common view region may be a common view region corresponding to the image sample predicted by the preset image processing model based on the input image sample pair. The labeled common view region may be a common view region labeled in advance in the image sample. The preset image processing model is trained, that is, a parameter of the preset image processing model is adjusted. During training the preset image processing model, the trained image processing model is obtained when a training stop condition is satisfied. The training stop condition may be any one of the following: training duration reaches preset duration, the number of times of training reaches a preset number of times, or loss information converges.

There may be a plurality of methods of training the preset image processing model according to the labeled common view region and the predicted common view region. For example, predicted geometric center coordinates and predicted boundary size information corresponding to the predicted common view region may be extracted from the predicted common view region. In the labeled common view region, the labeled geometric center coordinates and labeled boundary size information corresponding to the labeled common view region may be extracted from the labeled common view region. The preset image processing model is trained according to the predicted geometric center coordinates, the predicted boundary size information, the labeled geometric center coordinates, and the labeled boundary size information to obtain the trained image processing model.

The predicted geometric center coordinates may be the coordinates of a geometric center of a rectangular box corresponding to the predicted common view region, the predicted boundary size information may be the information of the size of the side length of the rectangular box corresponding to the predicted common view region, the labeled geometric center coordinates may be the coordinates of a geometric center of a rectangular box corresponding to the labeled common view region, and the labeled boundary size information may be the information of the size of the side length of the rectangular box corresponding to the labeled common view region.

There may be a plurality of methods of extracting the predicted geometric center coordinates and the predicted boundary size information corresponding to the predicted common view region from the predicted common view region. For example, the predicted center of attention coordinates and the predicted center point offset corresponding to the predicted common view region may be extracted from the predicted common view region; and the predicted geometric center coordinates and the predicted boundary size information corresponding to the predicted common view region are determined according to the predicted center of attention coordinates and the predicted center point offset.

The predicted center of attention coordinates may be the coordinates of a center with high importance degree in the predicted common view region, which may be understood as an center of attention of the predicted common view region. The predicted center point offset may be offset distance of the predicted center of attention coordinates relative to the bounding box of the predicted common view region.

The preset image processing model may be trained according to the predicted geometric center coordinates, the predicted boundary size information, the labeled geometric center coordinates, and the labeled boundary size information to obtain the trained image processing model after the predicted geometric center coordinates and the predicted boundary size information corresponding to the predicted common view region are extracted from the predicted common view region. There may be a plurality of methods of training the preset image processing model according to the predicted geometric center coordinates, the predicted boundary size information, the labeled geometric center coordinates, and the labeled boundary size information. For example, cycle consistency loss information corresponding to the preset image processing model may be calculated based on the predicted geometric center coordinates and the labeled geometric center coordinates; boundary loss information and average absolute error loss information corresponding to the preset image processing model are respectively calculated based on the predicted geometric center coordinates, the predicted boundary size information, the labeled geometric center coordinates, and the labeled boundary size information; the cycle consistency loss information, the average absolute error loss information, and the boundary loss information are taken as the loss information corresponding to the preset image processing model; and the preset image processing model is trained according to the loss information to obtained the trained image processing model.

The cycle consistency loss information may be the loss information of the preset image processing model determined based on a cycle consistency loss function, which is used for avoiding a mutual contradiction between samples generated by two generators. The average absolute error loss information may be the loss information determined based on a regression loss function (L1 loss), which is used for measuring an average error in a group of predicted values. The boundary loss information may be the loss information based on a boundary loss function (Generalized Intersection over Union), which is a loss function used for determining the bounding box of the predicted common view region and the bounding box of the labeled common view region.

There may be a plurality of methods of calculating the cycle consistency loss information corresponding to the preset image processing model based on the predicted geometric center coordinates and the labeled geometric center coordinates. For example, the cycle consistency loss information may be represented as $$L_{loc} = \|c_i - \hat{c}_i\|_1$$

Where $L_{loc}$ represents the cycle consistency loss information, $\| \; \|$ represents a norm symbol, and a norm is a function with the concept of "length". In linear algebra, functional analysis, and related field of mathematics, the function is a function, which means that all vectors in vector space are assigned with non-zero positive length or size. Where $\| \; \|_1$ represents a 1-norm, $c_i$ represents the labeled geometric center coordinates, and $\hat{c}_i$ represents the center point coordinates obtained after inputting the association feature between the images to be processed input into the preset image processing model.

There may be a plurality of methods of respectively calculating the boundary loss information and the average absolute error loss information corresponding to the preset image processing model based on the predicted geometric center coordinates, the predicted boundary size information, the labeled geometric center coordinates, and the labeled boundary size information. For example, the average absolute error loss information may be represented as $$L_{L1}=\|b_i-\hat{b}_i\|_1$$

Where $L_{L1}$ represents the average absolute error loss information, $b_i$ represents the labeled geometric center coordinates and the labeled boundary size information corresponding to the labeled common view region after being subjected to normalization, and $\hat{b}_i$ represents the predicted geometric center coordinates and the predicted boundary size information corresponding to the predicted common view region after being subjected to normalization, $b_i \in [0, 1]^4$.

The boundary loss information may be represented as $$L_{giou}=\mathcal{L}_{giou}(b_i,\hat{b}_i)$$

Where $L_{giou}$ represents the boundary loss information, $\mathcal{L}_{giou}()$ represents the boundary loss function, $b_i$ represents the labeled geometric center coordinates and the labeled boundary size information corresponding to the labeled common view region after being subjected to normalization, and $\hat{b}_i$ represents the predicted geometric center coordinates and the predicted boundary size information corresponding to the predicted common view region after being subjected to normalization.

The cycle consistency loss information, the average absolute error loss information, and the boundary loss information are taken as the loss information corresponding to the preset image processing model. In some embodiments, the loss information corresponding to the preset image processing model may be represented as $$\mathcal{L} = \sum_{i=a}^{b} \left( \lambda_{con}\|c_i - \tilde{c}_i\|_1 + \lambda_{loc}\|c_i - \hat{c}_i\|_1 + \lambda_{iou}\mathcal{L}_{giou}(b_i, \hat{b}_i) + \lambda_{L1}\|b_i - \hat{b}_i\|_1 \right)$$

Where $\mathcal{L}$ represents the loss information corresponding to the preset image processing model, $\|c_i-\tilde{c}_i\|_1$ represents the loss information between the predicted geometric center coordinates and the labeled geometric center coordinates, $\lambda_{con}$ is a hyper-parameter corresponding to the loss information, and $\lambda_{loc}$, $\lambda_{iou}$ and $\lambda_{L1}$ respectively represent hyper-parameters corresponding to the cycle consistency loss information, the boundary loss information, and the average absolute error loss information.

In some embodiments, two V100 video cards may be adopted to perform 35-epoch training (that is, 35 epochs) to replicate on a dataset (Megadepth) to train the preset image processing model, for example, the preset image processing model may be trained for 48 hours.

Therefore, the preset image processing model may be trained based on the loss information corresponding to the preset image processing model. When the loss information converges, the preset image processing model satisfies a training condition, and the preset image processing model satisfying a training condition may be taken as a trained image processing model.

After common view images of common view regions in the images to be processed are identified according to the association feature, a scale difference between the common view images may be calculated. There may be a plurality of methods of calculating the scale difference between the common view images. For example, size information of a common view image corresponding to each of the images to be processed may be acquired; at least one size difference between the images to be processed may be calculated based on the size information; and a target size difference satisfying a preset condition may be screened out from the size difference, and the target size difference may be taken as the scale difference between the common view images.

The size information may be the information including the size of the common view image corresponding to each image to be processed, for example, the size information including the length, the width, and the like of the common view image. The size difference may be a numerical value characterizing a difference between the size information of the images to be processed. The target size difference may be screened out from the size difference to serve as the size difference of the scale difference.

There may be a plurality of methods of calculating the at least one size difference between the images to be processed based on the size information. For example, a ratio of the width to the length of each common view image may be calculated to obtain at least one size difference between the common view images. For example, assuming that an image pair to be processed includes images to be processed Ia and Ib, the image to be processed Ia corresponds to a common view image Ia', the size information corresponding to the common view image Ia' is that the length is ha and the width is wa, the image to be processed Ib corresponds to a common view image Ib', and the size information corresponding to the common view image Ib' is that the length is hb and the width is wb, then, four size differences may be obtained, which are respectively ha/hb, hb/ha, wa/wb, and wb/wa.

The target size difference satisfying a preset condition may be screened out from the size difference after at least one size difference between the images to be processed is calculated based on the size information. There may be a plurality of methods of screening out the target size difference satisfying the preset condition from the size difference. For example, a size difference with the maximum numerical value may be screened from the size difference to serve as the target size difference. For example, assuming that the image pair to be processed includes images to be processed Ia and Ib, the image to be processed Ia corresponds to a common view image Ia', the size information corresponding to the common view image Ia' is that the length is ha and the width is wa, the image to be processed Ib corresponds to a common view image Ib', and the size information corresponding to the common view image Ib' is that the length is hb and the width is wb, then the four size differences may be obtained, which are respectively (ha/hb, hb/ha, wa/wb, and wb/wa), the target size difference may be S(Ia', Ib')=max (ha/hb, hb/ha, wa/wb, wb/wa), and max ( ) may represent a function for taking a maximum value, so that the maximum size difference may be taken as the scale difference between the common view images.

104: Adjust a size of the common view image based on the scale difference to obtain an adjusted common view image.

The adjusted common view image may be the common view image obtained by adjusting according to the scale difference between the common view images.

In order to improve the accuracy of extracting and matching feature points between the common view images, the size of each common view image may be adjusted based on the scale difference, so that the processing such as feature point extracting and matching may be performed in the common view image in the same scale. There may be a plurality of methods of adjusting the size of the common view image based on the scale difference. For example, an original length and an original width of the common view image may be acquired, and the original length and the original width of the common view image may be respectively multiplied by the scale difference to obtained an adjusted scale and an adjusted width, so that the common view image may be scaled based on the adjusted scale and the adjusted width to adjust the size of the common view image, so as to obtain the adjusted common view image.

105: Extract at least one common view feature point from each adjusted common view image, and process the image pair to be processed based on the common view feature point.

The common view feature point may be a feature point extracted from the adjusted common view image.

There may be a plurality of methods of extracting at least one common view feature point from each adjusted common view image. For example, at least one common view feature point may be extracted from each adjusted common view image by using feature point extraction methods such as a corner detection algorithm (a FAST algorithm), scale-invariant feature transform (called SIFT for short), and speeded up robust features (called SURF for short).

The image pair to be processed may be processed based on the common view feature point after the at least one common view feature point is extracted from each adjusted common view image. There may be a plurality of methods of processing the image pair to be processed based on the common view feature point. For example, feature point matching may be performed on the common view feature point of each of the images to be processed in the image pair to be processed in the adjusted common view image to obtain a matched common view feature point; a source feature point corresponding to the matched common view feature point may be determined in the image to be processed based on the scale difference and the size information of the adjusted common view image; and the image to be processed may be processed based on the source feature point.

The matched common view feature point may be the common view feature point, matched with the common view feature point in another adjusted common view image, in the adjusted common view image of a certain image to be processed. The source feature point may be the feature point corresponding to the image to be processed corresponding to the matched common view feature point.

There may be a plurality of methods of performing feature point matching on the common view feature point of each of the images to be processed in the image pair to be processed in the adjusted common view image. For example, the distances between a certain common view feature point descriptor and all common view feature point descriptors in other adjusted common view images may be calculated by using a distance matching method (Brute-Froce Matcher), then the obtained distances are sorted, and the closest common view feature point may be taken as a matched point to obtain a matched common view feature point.

The source feature point corresponding to the matched common view feature point may be determined in the image to be processed based on the scale difference and the size information of the adjusted common view image after feature point matching is performed on the common view feature point of each of the images to be processed in the image pair to be processed in the adjusted common view image. There may be a plurality of methods of determining the source feature point corresponding to the matched common view feature point in the image to be processed based on the scale difference and the size information of the adjusted common view image. For example, pose estimation may be performed on the adjusted common view image according to the matched common view feature point in the adjusted common view image to obtain adjusted pose information corresponding to the adjusted common view image, so that original pose information corresponding to the image to be processed may be calculated based on the adjusted pose information, the scale difference, and the size information of the adjusted common view image, a position of the matched common view feature point in the adjusted common view image is inversely transformed to the image to be processed according to the original pose information, and the source feature point corresponding to the matched common view feature point may be determined in the image to be processed.

In some embodiments, pose estimation may be performed on the adjusted common view image according to the matched common view feature point in the adjusted common view image by using a random sample consensus (called RANSAC for short) algorithm. The RANSAC algorithm is to estimate a parameter of a model in an iteration manner in a data set including an outlier.

The image to be processed may be processed based on the source feature point after the source feature point corresponding to the matched common view feature point is determined based on the scale difference and the size information of the common view image. There may be a plurality of methods of processing the image to be processed, for example, processing such as extracting, matching, and positioning may be performed on a feature point in the image to be processed. The image to be processed may also be further applied on this basis, for example, data positioning and the like may be performed on a virtual map application, which is not limited herein.

Figure 5:
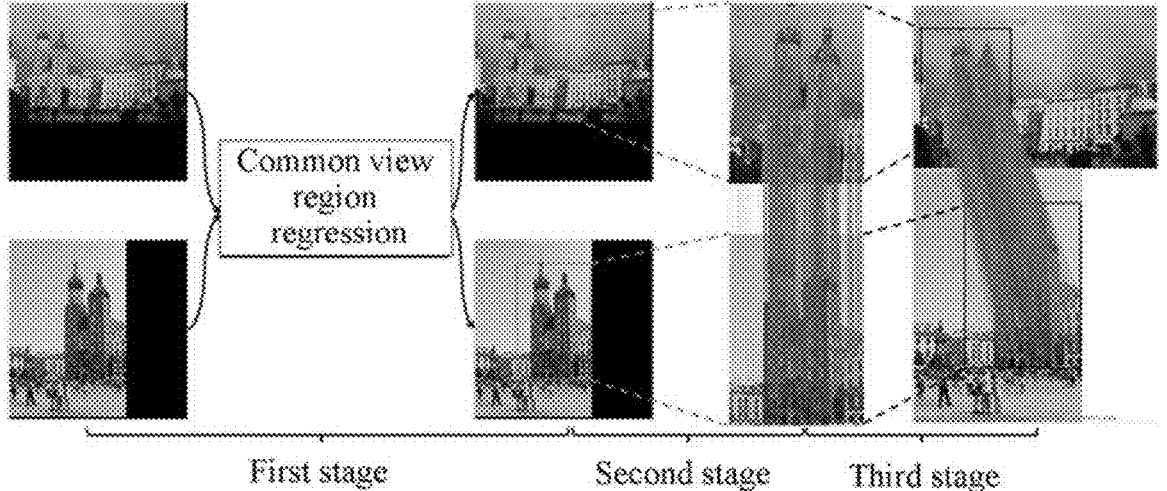
FIG. 5 is an overall schematic flowchart of an image processing method provided by an embodiment of this application.

An embodiment of this application further provides an image processing method. Refer to FIG. 5, which is an overall schematic flowchart of an image processing method provided by an embodiment of this application. In a first stage, an image processing model provided by the embodiment of this application performs regression on common view regions of two input images to be processed to acquire the positions where the corresponding regions are located, and segments to obtain common view images. In a second stage, scale alignment is performed on the common view images at an image layer, and feature point extracting and matching are performed on the adjusted common view image after being subjected to scale alignment. In one aspect, it may be ensured that the feature point is extracted in an image in one scale, which can reduce the difficulty in feature point extracting and matching and improve the efficiency of feature point extracting and matching. In the other aspect, feature point matching is performed on the common view region, which can effectively improve an outer point filtering effect, improve the accuracy of feature point matching, and meanwhile, improve the rate of feature point matching. In a third stage, the original pose information corresponding to the image to be processed is calculated, so that the position of the matched common view feature point in the adjusted common view image may be inversely transformed to the image to be processed according to the original pose information, and the source feature point corresponding to the matched common view feature point may be determined in the image to be processed. Therefore, the image processing method provided by the embodiment of this application may effectively process the feature extracting, matching, and positioning in a case of a great scale difference, is more dense compared with the existing feature extracting matching algorithm, is applicable to tasks such as image registration, large-scale scenario reconstruction, simultaneous location and mapping (SLAM), and visual positioning, and can improve the accuracy and rate of image processing, thereby improving the efficiency of processing the images.

It can be known from the above that, according to the embodiment of this application, an image pair to be processed is acquired, and image feature extraction is performed on an image to be processed in the image pair to be processed to obtain an image feature of the image to be processed; an association feature of the image pair to be processed is extracted from the image feature; a common view image of a common view region in the image to be processed is identified according to the association feature, and a scale difference between common view images is calculated; a size of the common view image is adjusted based on scale difference to obtain adjusted common view image; and at least one common view feature point is extracted from each adjusted common view image, and the image pair to be processed is processed based on the common view feature point. Therefore, the association feature characterizing mutual information between the images to be processed is extracted from the image feature, and the common view image of the common view region between the two images to be processed is identified from the images to be processed according to the association feature, so as to perform fast extracting and matching on the common view feature point in the common view region based on the common view image, which improves the rate and accuracy of feature point matching, thereby improving the accuracy and rate of processing images, and improving the image processing efficiency.

According to the method described in the above embodiments, the following further describes in detail by using an example.

In this embodiment, an example in which an image processing apparatus is specifically integrated into a computer device is used for description. The image processing method is specifically described by taking a server as an execution subject. The parts included in this embodiment that are the same as those in the previous embodiments may refer to relevant explanations in the previous embodiments. To better describe the embodiment of this application, refer to FIG. 6. As shown in FIG. 6, FIG. 6 is another schematic flowchart of an image processing method provided by an embodiment of this application. A specific process is as follows:

in step 201, a server acquires an image sample pair, predicts a common view region of each image sample in the image sample pair by using a preset image processing model to obtain a predicted common view region, extracts predicted center of attention coordinates and a predicted center point offset corresponding to the predicted common view region in the predicted common view region, and determines predicted geometric center coordinates and predicted boundary size information corresponding to the predicted common view region according to the predicted center of attention coordinates and the predicted center point offset.

In step 202, the server extracts labeled geometric center coordinates and labeled boundary size information corresponding to a labeled common view region in the labeled common view region of the image sample, calculates cycle consistency loss information corresponding to the preset image processing model based on the predicted geometric center coordinates and the labeled geometric center coordinates, and respectively calculates boundary loss information and average absolute error loss information corresponding to the preset image processing model based on the predicted geometric center coordinates, the predicted boundary size information, the labeled geometric center coordinates, and the labeled boundary size information.

In step 203, the server takes the cycle consistency loss information, the average absolute error loss information, and the boundary loss information as the loss information corresponding to the preset image processing model, and trains the preset image processing model according to the loss information to obtain a trained image processing model.

In step 204, the server acquires a image pair to be processed, performs feature mapping on an image to be processed in the image pair to be processed to obtain a feature map corresponding to the image to be processed, performs dimension reduction processing on the feature map corresponding to the image to be processed to obtain a feature map after dimension reduction, performs multi-scale feature extraction on the feature map after dimension reduction to obtain a scale image feature corresponding to the image to be processed at each scale, and fuses the scale image feature corresponding to the image to be processed at each scale to obtain an image feature of the image to be processed.

In step 205, the server performs flattening processing on the image feature to obtain a flat image feature of the image to be processed, performs feature extraction on the flat image feature to obtain an initial association feature corresponding to each sub-flat image feature in the flat image feature, determines an initial association weight corresponding to each sub-flat image feature in the flat image feature based on the initial association feature, and fuses each sub-flat image feature in the flat image feature according to the initial association weight to obtain an initial attention feature corresponding to the image to be processed.

In step 206, the server performs cross feature extraction on the image feature and the initial attention feature to obtain a cross association feature corresponding to each of the images to be processed, determines a cross association weight corresponding to the image to be processed according to the cross association feature, and performs weighting on the initial attention feature corresponding to each of the images to be processed based on the cross association weight to obtain the association feature corresponding to the image to be processed.

In step 207, the server acquires a preset region feature, performs feature extraction on the preset region feature by using the trained image processing model to obtain a region association feature corresponding to each region sub-feature in the preset region feature, determines a region association weight corresponding to each region sub-feature in the preset region feature based on the region association feature, and fuses each region sub-feature in the preset region feature according to the region association weight to obtain an initial region feature.

In step 208, the server performs feature extraction on the initial region feature and the association feature to obtain an image association feature corresponding to the association feature and an initial region association feature corresponding to the initial region feature, determines an image association weight corresponding to the association feature according to the image association feature and the initial region association feature, performs weighting on the association feature based on the image association weight to obtain a common view image feature, and fuses the common view image feature and the initial region feature to obtain a common view region feature.

In step 209, the server calculates a common view weight corresponding to the association feature based on the common view region feature and the association feature, calculates an attention weight of each preset coordinate point in the common view region according to the common view weight and the common view image feature, performs weighting on the preset coordinate point based on the attention weight to obtain a weighted coordinate point, and accumulates the weighted coordinate point to obtain center of attention coordinates in the image to be processed.

In step 210, the server performs regression processing on the common view region feature to obtain a relative center point offset corresponding to the common view region, calculates geometric center coordinates and boundary size information of the common view region in the image to be processed according to the center of attention coordinates and the relative center point offset, determines a common view region of the image to be processed in the image to be processed based on the geometric center coordinates and the boundary size information, and segments the common view region in the image to be processed to obtain a common view image in the common view region.

In step 211, the server acquires size information of the common view image corresponding to each of the images to be processed, calculates at least one size difference between the images to be processed based on the size information, screens out a target size difference satisfying a preset condition from the size difference, takes the target size difference as the scale difference between the common view images, and adjusts the size of the common view image based on the scale difference to obtain an adjusted common view image.

In step 212, the server extracts at least one common view feature point from each adjusted common view image, performs feature point matching on the common view feature point of each of the images to be processed in the image pair to be processed in the adjusted common view image to obtain a matched common view feature point, determines a source feature point corresponding to the matched common view feature point in the image to be processed based on the scale difference and the size information of the adjusted common view image, and processes the image to be processed based on the source feature point.

It can be known from the above that, according to the embodiment of this application, the association feature characterizing mutual information between the images to be processed extracted from the image feature is trained, and the common view image of the common view region between the two images to be processed is identified from the images to be processed according to the association feature, so as to perform fast extracting and matching on the common view feature point in the common view region based on the common view image, which improves the rate and accuracy of feature point matching and can effectively process the feature point extracting, matching, and positioning in a case of great scale difference, thereby improving the accuracy and rate of processing images, and improving the efficiency of processing the images.

It is to be understood that, although various steps in the flowcharts involved in various embodiments are sequentially displayed according to the instructions of arrows, these steps are not necessarily sequentially performed according to the sequence instructed by the arrows. Unless otherwise explicitly specified in this application, execution of the steps is not strictly limited, and these steps may be performed in other sequences. Moreover, at least part steps in the flowcharts involved in various embodiments may include a plurality of steps or a plurality of stages. These steps or stages are not necessarily performed at the same moment but may be performed at different moments. These steps or stages are not necessarily sequentially performed, but may be in turn or alternately performed with other steps or at least part of the steps or stages of other steps.

To better implement the above method, the embodiment of this application further provides an image processing apparatus. The image processing apparatus may be integrated in a computer device. The computer device may be a server.

Figure 7:
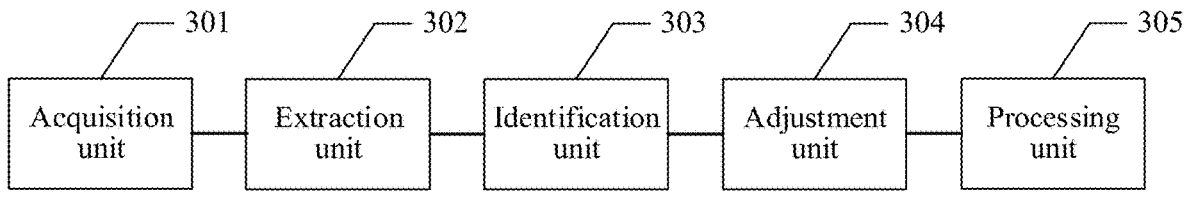
FIG. 7 is a schematic structural diagram of an image processing apparatus provided by an embodiment of this application.

For example, as shown in FIG. 7, it is a schematic structural diagram of an image processing apparatus provided by an embodiment of this application. The image processing apparatus may include an acquisition unit 301, an extraction unit 302, an identification unit 303, and adjustment unit 304, and a processing unit 305 as follows.

The acquisition unit 301 is configured to acquire an image pair to be processed, and perform image feature extraction on an image to be processed in the image pair to be processed to obtain an image feature of the image to be processed.

The extraction unit 302 is configured to extract an association feature of the image pair to be processed from the image feature. The association feature is used for characterizing mutual information between images to be processed in the image pair to be processed.

The identification unit 303 is configured to identify a common view image of a common view region in the image to be processed according to the association feature, and calculate a scale difference between the common view images.

The adjustment unit 304 is configured to adjust a size of the common view image based on the scale difference to obtain an adjusted common view image.

The processing unit 305 is configured to extract at least one common view feature point from each of the adjusted common view images, and process the image pair to be processed based on the common view feature point.

In one embodiment, the identification module 303 includes: an initial region feature extraction subunit, configured to acquire a preset region feature, and perform feature extraction on the preset region feature by using a trained image processing model to obtain an initial region feature; a cross feature extraction subunit, configured to perform cross feature extraction on the initial region feature and the association feature to obtain a common view region feature corresponding to the initial region feature; and a common view image identification subunit, configured to identify the common view image in the common view region in the image to be processed based on the common view region feature and the association feature.

In one embodiment, the initial region feature extraction subunit includes: a region association feature extraction module, configured to perform feature extraction on the preset region feature by using the trained image processing model to obtain a region association feature corresponding to each region sub-feature in the preset region feature; a region association weight determination module, configured to determine a region association weight corresponding to each region sub-feature in the preset region feature based on the region association feature; and an initial region feature fusion module, configured to fuse each region sub-feature in the preset region feature according to the region association weight to obtain an initial region feature.

In one embodiment, the cross feature extraction subunit includes: a cross feature extraction module, configured to perform feature extraction on the initial region feature and the association feature to obtain an image association feature corresponding to the association feature and an initial region association feature corresponding to the initial region feature; an association weight determination module, configured to determine an image association weight corresponding to the association feature according to the image association feature and the initial region association feature; and a common view weighting module, configured to perform weighting on the association feature based on the image association weight to obtain a common view image feature, and fuse the common view image feature and the initial region feature to obtain a common view region feature.

In one embodiment, the common view image identification subunit includes: a common view weight calculation module, configured to calculate a common view weight corresponding to the association feature based on the common view region feature and the association feature; an center of attention coordinate determination module, configured to determine center of attention coordinates in the image to be processed based on the common view weight and the association feature; a relative center point offset regression module, configured to perform regression processing on the common view region feature to obtain a relative center point offset corresponding to a common view region; and a common view image identification module, configured to identify a common view image in the common view region in the image to be processed based on the center of attention coordinates and the relative center point offset.

In one embodiment, the common view image identification module includes: geometric center coordinate and boundary size information calculation subunit, configured to calculate geometric center coordinates and boundary size information of the common view region in the image to be processed according to the center of attention coordinates and the relative center point offset; a common view region determination submodule, configured to determine the common view region of the image to be processed in the image to be processed based on the geometric center coordinates and the boundary size information; and a common view image segmentation submodule, configured to segment the common view region in the image to be processed to obtain the common view image in the common view region.

In one embodiment, the center of attention coordinate determination module includes: an attention weight calculation submodule, configured to calculate an attention weight of each preset coordinate point in the common view region according to the common view weight and the common view image feature; a coordinate point weighting submodule, configured to perform weighting on the preset coordinate point based on the attention weight to obtain a weighted coordinate point; and a coordinate point accumulation submodule, configured to accumulate the weighted coordinate point to obtain center of attention coordinates in the image to be processed.

In one embodiment, the image processing apparatus further includes: an image sample acquisition unit, configured to acquire an image sample pair, an image sample in the image sample pair including a labeled common view region; a predicted common view region prediction unit, configured to predict a common view region of each image sample in the image sample pair by using a preset image processing model to obtain a predicted common view region; and a training unit, configured to train the preset image processing model according to the labeled common view region and the predicted common view region to obtain a trained image processing model.

In one embodiment, the training unit includes: a predicted geometric center coordinate and predicted boundary size information extraction subunit, configured to extract predicted geometric center coordinates and predicted boundary size information corresponding to the predicted common view region from the predicted common view region; a labeled geometric center coordinate and labeled boundary size information extraction subunit, configured to extract labeled geometric center coordinates and labeled boundary size information corresponding to the labeled common view region from the labeled common view region; and a training unit, configured to train the preset image processing model according to the predicted geometric center coordinates, the predicted boundary size information, the labeled geometric center coordinates, and the labeled boundary size information to obtain the trained image processing model.

In one embodiment, the predicted geometric center coordinate and predicted boundary size information extraction subunit is configured to: extract predicted center of attention coordinates and predicted center point offset corresponding to the predicted common view region from the predicted common view region; and determine the predicted geometric center coordinates and the predicted boundary size information corresponding to the predicted common view region according to the predicted center of attention coordinates and the predicted center point offset.

In one embodiment, the training subunit includes: a first loss information calculation module, configured to calculate cycle consistency loss information corresponding to the preset image processing model based on the predicted geometric center coordinates and the labeled geometric center coordinates; a second loss information calculation module, configured to respectively calculate boundary loss information and average absolute error loss information corresponding to the preset image processing model based on the predicted geometric center coordinates, the predicted boundary size information, the labeled geometric center coordinates, and the labeled boundary size information; and a training module, configured to take the cycle consistency loss information, the average absolute error loss information, and the boundary loss information as loss information corresponding to the preset image processing model, and train the preset image processing model according to the loss information to obtain a trained image processing model.

In one embodiment, the extraction unit 302 includes: a flattening processing subunit, configured to perform flattening processing on the image feature to obtain a flat image feature of the image to be processed; an initial attention feature extraction subunit, configured to perform feature extraction on the flat image feature to obtain an initial attention feature corresponding to the image to be processed; and an association feature cross extraction subunit, configured to perform cross feature extraction on the initial attention feature to obtain an association feature of each of the images to be processed in the image pair to be processed.

In one embodiment, the initial attention feature extraction subunit includes: an initial association feature extraction module, configured to perform feature extraction on the flat image feature to obtain an initial association feature corresponding to each sub-flat image feature in the flat image feature; an initial association weight determination module, configured to determine an initial association weight corresponding to each sub-flat image feature in the flat image feature based on the initial association feature; and an initial attention feature fusion module, configured to fuse each sub-flat image feature in the flat image feature based on the initial association weight to obtain an initial attention feature corresponding to the image to be processed.

In one embodiment, the association feature cross extraction subunit includes: a cross association feature extraction module, configured to perform cross feature extraction on the image feature and the initial attention feature to obtain a cross association feature corresponding to each image to be processed; a cross association weight determination module, configured to a cross association weight corresponding to the image to be processed according to the cross association feature; and a cross association weight weighting module, configured to perform weighting on the initial attention feature corresponding to each image to be processed based on the cross association weight to obtain an association feature corresponding to the image to be processed.

In one embodiment, the acquisition unit 301 includes: a feature mapping subunit, configured to perform feature mapping on the image to be processed in the image pair to be processed to obtain feature map corresponding to the image to be processed; a dimension reduction processing subunit, configured to perform dimension reduction processing on the feature map corresponding to the image to be processed to obtain a feature map after dimension reduction; a multi-scale feature extraction subunit, configured to perform multi-scale feature extraction on the feature map after dimension reduction to obtain a scale image feature corresponding to the image to be processed at each scale; and an image feature fusion subunit, configured to fuse the scale image feature corresponding to the image to be processed at each scale to obtain the image feature of the image to be processed.

In one embodiment, the identification module 303 includes: a size information acquisition subunit, configured to acquire size information of a common view image corresponding to each of the images to be processed; a size difference calculation subunit, configured to calculate at least one size difference between the images to be processed based on the size information; and a scale difference screening subunit, configured to screen out a target size difference satisfying a preset condition from the size difference, and take the target size difference as the scale difference between the common view images.

In one embodiment, the processing unit 305 includes: a common view feature point matching subunit, configured to perform feature point matching on the common view feature point of each image to be processed in the image pair to be processed in the adjusted common view image to obtain a matched common view feature point; a source feature point determination subunit, configured to determine a source feature point corresponding to the matched common view feature point in the image to be processed based on the scale difference and the size information of the adjusted common view image; and a processing subunit, configured to process the image pair to be processed based on the source feature point.

During specific implementation, various units above may be implemented as independent entities, or may be randomly combined, or may be implemented as a same entity or several entities. For specific implementation of the foregoing units, refer to the foregoing method embodiments. Details are not described herein again.

It can be known from the above that, according to the embodiment of this application, the acquisition unit 301 acquires a image pair to be processed, and performs image feature extraction on an image to be processed in the image pair to be processed to obtain an image feature of the image to be processed; the extraction unit 302 extracts an association feature of the image pair to be processed from the image feature; the identification unit 303 identifies a common view image of a common view region in the image to be processed according to the association feature, and calculates a scale difference between the common view images; the adjustment unit 304 adjusts a size of the common view image based on the scale difference to obtain an adjusted common view image; and the processing unit 305 extracts at least one common view feature point from each adjusted common view image, and processes the image pair to be processed based on the common view feature point. Therefore, the association feature characterizing mutual information between the images to be processed is extracted from the image feature, and the common view image of the common view region between the two images to be processed is identified from the images to be processed according to the association feature, so as to perform fast extracting and matching on the common view feature point in the common view region based on the common view image, which improves the rate and accuracy of feature point matching, thereby improving the accuracy and rate of processing images, and improving the image processing efficiency.

Figure 8:
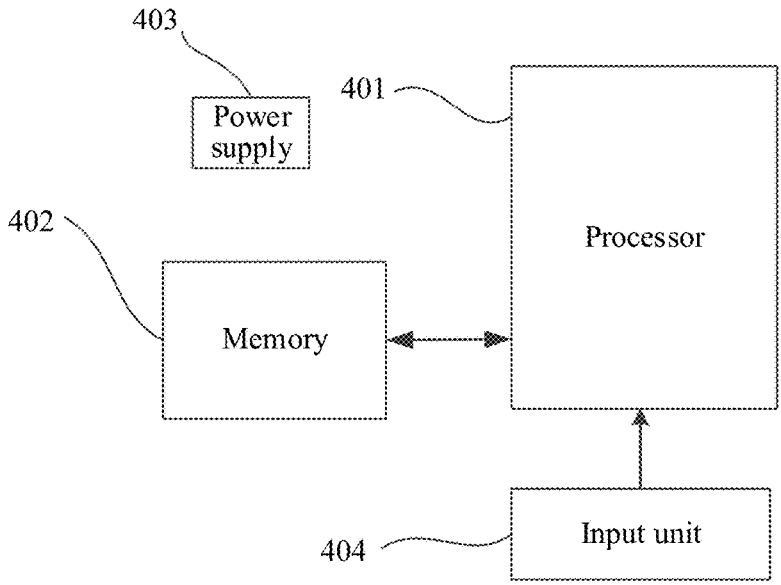
FIG. 8 is a schematic structural diagram of a computer device provided by an embodiment of this application.

An embodiment of this application further provides a computer device. As shown in FIG. 8, it is a schematic structural diagram of a computer device involved in an embodiment of this application. The computer device may be a server, specifically:

the computer device may include components such as a processor 401 of one or more processing cores above, a memory 402 of one or more computer-readable storage media, a power supply 403, and an input unit 404. A person of skill in the art can understand that, a structure of the computer device shown in FIG. 8 does not constitute a limit on the computer device, and may include components that are more or fewer than those shown in the figure, or a combination of some components, or different component arrangements. Where:

the processor 401 is a control center of the computer device, connects to various parts of the entire computer device by using various interfaces and lines, and performs various functions and data processing of the computer device by running or executing software programs and/or modules stored in the memory 402, and invoking data stored in the memory 402. In some embodiments, processor 401 may include one or more processing cores. Preferably, processor 401 may integrate an application processor and a modem processor. The application processor mainly processes an operating system, a user interface, an application program, and the like. The modem processor mainly processes wireless communication. It may be understood that the above modem processor may not be integrated into the processor 401.

Memory 402 may be configured to store a software program and module. The processor 401 runs the software program and module stored in memory 402 to execute various functional applications and data processing. Memory 402 may mainly include a program storage area and a data storage area. The program storage area may store an operating system, an application program required by at least one function (for example, a sound playing function and an image playing function), and the like. The data storage area may store data created according to use of the computer device. In addition, memory 402 may include a high speed random access memory, and may also include a non-volatile memory, such as at least one magnetic disk storage device, a flash memory device, or another volatile solid-state storage device. Correspondingly, the memory 402 may further include a memory controller to provide access of the processor 401 to the memory 402.

The computer device further includes the power supply 403 for supplying power to various components. Preferably, the power supply 403 may be logically connected to the processor 401 by using a power supply management system to implement functions of managing charge, discharge, power consumption, and the like by using the power supply management system. The power supply 403 may further include one or more of a direct current or alternating current power supply, a re-charging system, a power failure detection circuit, a power supply converter or inverter, a power supply state indicator, and any other components.

The computer device may further include the input unit 404. The input unit 404 may be configured to receive input numeric or character information and generate keyboard, mouse, joystick, optical, or trackball signal input related to user settings and function control.

Although not shown in the figure, the computer device may further include a display unit and the like. Details are not described herein again. Specifically, in this embodiment, processor 401 in the computer device may load, according to the following instructions, executable files corresponding to processes of one or more applications into the memory 402. processor 401 runs the applications stored in memory 402, so as to implement an image processing method. The image processing method and the image processing method in the embodiments hereinbefore belong to the same concept, and for details of a specific implementation process, refer to the method embodiments hereinbefore.

In one embodiment, a computer device is provided, including a memory and a processor. The memory stores a computer-readable instruction, and the processor implements the steps of the above image processing method when executing the computer-readable instruction.

In one embodiment, a computer-readable storage medium is provided. The computer-readable storage medium stores a computer-readable instruction, and the computer-readable instruction implements steps of the above image processing method when executed by a processor.

In one embodiment, a computer program product is provided, including computer-readable instruction. The computer-readable instruction implements steps of the above image processing method when executed by a processor.

User information (including, but not limited to, user device information, user personal information, and the like) and data (including, but not limited to, data used for analyzing, data used for storage, data used for displaying, and the like) involved in this application are both the information and data authorized by the user or all parties.

A person of ordinary skill in the art may understand that all or part flows of the method in the above embodiments may be completed by a computer-readable instruction instructing relevant hardware. The computer-readable instruction may be stored in a non-volatile computer-readable storage medium. When the computer-readable instruction is executed, the flows of the embodiments of the above methods may be included. Any reference to a memory, a database, or other media used in various embodiments provided by this application may include at least one of a non-volatile memory and a volatile memory. The non-volatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory. By way of illustration and not limitation, the RAM may be in a variety of forms such as a static random access memory (SRAM), a dynamic random access memory (DRAM), or the like. The database involved in various embodiments provided by this application may include at least one of a relational database and a non-relational database. The non-relational database may include, but is not limited to, a blockchain-based distributed database, and the like. The processor involved in various embodiments provided by this application may be, but is not limited to, a general-purpose processor, a central processing unit, a graphics processing unit, a digital signal processor, a programmable logic device, a quantum computing-based data processing logic device, and the like.

The technical features in various embodiments above may be randomly combined. For concise description, not all possible combinations of the technical features in the embodiments are described. However, provided that combinations of the technical features do not conflict with each other, the combinations of the technical features are considered as falling within the scope described in this specification.

The above embodiments merely express several implementations of this application. The descriptions thereof are relatively specific and detailed, but cannot be understood as limitations to the patent scope of this application. For a person of ordinary skill in the art, several transformations and improvements can also be made on the premise of not departing from the concept of this application. These transformations and improvements all belong to the protection scope of this application. Therefore, the protection scope of the patent of this application shall be subject to the appended claims.

What is claimed is:

1. An image processing method, performed by a computer device, comprising:

acquiring an image pair to be processed, and performing image feature extraction on each image to be processed in the image pair to be processed to obtain a respective image feature of the image to be processed;

extracting, for each image in the image pair, a respective association feature from the image features, each association feature characterizing mutual information between the images in the image pair to be processed;

identifying, for each image in the image pair, a respective common view image of a common view region in the respective image to be processed according to the respective association feature, and calculating a scale difference between the common view images;

adjusting a size of each common view image based on the scale difference to obtain a respective adjusted common view image; and extracting at least one common view feature point from each of the adjusted common view images, and processing the image pair to be processed based on the at least one common view feature point.

2. The method according to claim 1, wherein the identifying, for each image in the image pair, the respective common view image of the common view region in the respective image to be processed according to the respective association feature comprises:

acquiring a region feature, and performing feature extraction on the region feature by using a trained image processing model to obtain an initial region feature;

performing cross feature extraction on the initial region feature and the respective association feature to obtain a common view region feature corresponding to the initial region feature; and identifying the common view image in the common view region in the image to be processed based on the common view region feature and the respective association feature.

3. The method according to claim 2, wherein the region feature comprises a plurality of region sub-features, and the performing feature extraction on the region feature by using the trained image processing model to obtain the initial region feature comprises:

performing feature extraction on the region feature by using the trained image processing model to obtain a region association feature corresponding to each region sub-feature in the region feature;

determining a region association weight corresponding to each region sub-feature in the region feature based on the region association feature; and fusing each region sub-feature in the region feature according to the region association weight to obtain the initial region feature.

4. The method according to claim 2, wherein the performing cross feature extraction on the initial region feature and the respective association feature to obtain the common view region feature corresponding to the initial region feature comprises:

performing feature extraction on the initial region feature and the respective association feature to obtain an image association feature and an initial region association feature corresponding to the initial region feature;

determining an image association weight corresponding to the respective association feature according to the image association feature and the initial region association feature; and performing weighting on the respective association feature based on the image association weight to obtain a common view image feature, and fusing the common view image feature and the initial region feature to obtain the common view region feature.

5. The method according to claim 2, wherein the identifying the common view image in the common view region in the image to be processed based on the common view region feature and the respective association feature comprises:

calculating a common view weight corresponding to the respective association feature based on the common view region feature and the respective association feature;

determining center of attention coordinates in the image to be processed based on the common view weight and the respective association feature;

performing regression processing on the common view region feature to obtain a relative center point offset corresponding to the common view region; and identifying the common view image in the common view region in the image to be processed based on the center of attention coordinates and the relative center point offset.

6. The method according to claim 5, wherein the identifying the common view image in the common view region in the image to be processed based on the center of attention coordinates and the relative center point offset comprises:

calculating geometric center coordinates and boundary size information of the common view region in the image to be processed according to the center of attention coordinates and the relative center point offset;

determining the common view region of the image to be processed in the image to be processed based on the geometric center coordinates and the boundary size information; and segmenting the common view region in the image to be processed to obtain the common view image in the common view region.

7. The method according to claim 5, wherein the determining the center of attention coordinates in the image to be processed based on the common view weight and the respective association feature comprises:

calculating an attention weight of each coordinate point in the common view region according to the common view weight and the respective association feature;

performing weighting on the coordinate point based on the attention weight to obtain a weighted coordinate point; and accumulating the weighted coordinate point to obtain the center of attention coordinates in the image to be processed.

8. The method according to claim 2, further comprising:

acquiring an image sample pair, an image sample in the image sample pair comprising a labeled common view region;

predicting a common view region of each image sample in the image sample pair by using an image processing model to obtain a predicted common view region; and training the image processing model according to the labeled common view region and the predicted common view region to obtain a trained image processing model.

9. The method according to claim 8, wherein the training the image processing model according to the labeled common view region and the predicted common view region to obtain the trained image processing model comprises:

extracting predicted geometric center coordinates and predicted boundary size information corresponding to the predicted common view region from the predicted common view region;

extracting labeled geometric center coordinates and labeled boundary size information corresponding to the labeled common view region from the labeled common view region; and training the image processing model according to the predicted geometric center coordinates, the predicted boundary size information, the labeled geometric center coordinates, and the labeled boundary size information to obtain the trained image processing model.

10. The method according to claim 9, wherein the extracting the predicted geometric center coordinates and the predicted boundary size information corresponding to the predicted common view region from the predicted common view region comprises:

extracting predicted center of attention coordinates and a predicted center point offset corresponding to the predicted common view region from the predicted common view region; and determining the predicted geometric center coordinates and the predicted boundary size information corresponding to the predicted common view region according to the predicted center of attention coordinates and the predicted center point offset.

11. The method according to claim 10, wherein the training the image processing model according to the predicted geometric center coordinates, the predicted boundary size information, the labeled geometric center coordinates, and the labeled boundary size information to obtain the trained image processing model comprises:

calculating cycle consistency loss information corresponding to the image processing model based on the predicted geometric center coordinates and the labeled geometric center coordinates;

calculating boundary loss information and average absolute error loss information corresponding to the image processing model respectively based on the predicted geometric center coordinates, the predicted boundary size information, the labeled geometric center coordinates, and the labeled boundary size information; and taking the cycle consistency loss information, the average absolute error loss information, and the boundary loss information as the loss information corresponding to the image processing model, and training the image processing model according to the loss information to obtain the trained image processing model.

12. The method according to claim 1, wherein the extracting, for each image in the image pair, the respective association feature from the image features comprises:

performing flattening processing on each of the image features to obtain a respective flat image feature of the respective image to be processed;

performing feature extraction on the respective flat image feature to obtain a respective initial attention feature corresponding to the respective image to be processed; and performing cross feature extraction on the respective initial attention feature and a flat image feature of the other image in the image pair to obtain the respective association feature of each of the images to be processed in the image pair to be processed.

13. The method according to claim 12, wherein the flat image feature comprises a plurality of sub-flat image features, and the performing feature extraction on the respective flat image feature to obtain the respective initial attention feature corresponding to the respective image to be processed comprises:

performing feature extraction on the flat image feature to obtain an initial association feature corresponding to each sub-flat image feature in the flat image feature;

determining an initial association weight corresponding to each sub-flat image feature in the flat image feature based on the initial association feature; and fusing each sub-flat image feature in the flat image feature based on the initial association weight to obtain the initial attention feature corresponding to the image to be processed.

14. The method according to claim 12, wherein the performing cross feature extraction on the respective initial attention feature to obtain the respective association feature of each of the images to be processed in the image pair to be processed comprises:

performing cross feature extraction on the respective image feature and the respective initial attention feature to obtain a cross association feature corresponding to each of the images to be processed;

determining a cross association weight corresponding to the image to be processed according to the cross association feature; and performing weighting on the initial attention feature corresponding to each of the images to be processed based on the cross association weight to obtain the respective association feature corresponding to the respective image to be processed.

15. The method according to claim 1, wherein the performing image feature extraction on each image to be processed in the image pair to be processed to obtain the respective image feature of the image to be processed comprises:

performing feature mapping on the image to be processed in the image pair to be processed to obtain a feature map;

performing dimension reduction processing on the feature map corresponding to the image to be processed to obtain a feature map after dimension reduction;

performing multi-scale feature extraction on the feature map after dimension reduction to obtain a scale image feature corresponding to the image to be processed at each scale; and fusing the scale image feature corresponding to the image to be processed at each scale to obtain an image feature of the image to be processed.

16. The method according to claim 1, wherein the calculating the scale difference between the common view images comprises:

acquiring size information of the common view image corresponding to each of the images to be processed;

calculating at least one size difference between the images to be processed based on the size information; and screening out a target size difference satisfying a condition from the size difference, and taking the target size difference as the scale difference between the common view images.

17. The method according to claim 1, wherein the processing the image pair to be processed based on the at least one common view feature point comprises:

performing feature point matching on the at least one common view feature point in the respective adjusted common view image in each of the images to be processed in the image pair to be processed to obtain a matched common view feature point;

determining a source feature point corresponding to the matched common view feature point in the image to be processed based on the scale difference and the size information of the adjusted common view image; and processing the image pair to be processed based on the source feature point.

18. A computer device, comprising a memory and a processor, the memory storing a computer-readable instruction, and the processor implementing steps of an image processing method, comprising:

acquiring an image pair to be processed, and performing image feature extraction on each image to be processed in the image pair to be processed to obtain a respective image feature of the image to be processed;

extracting, for each image in the image pair, a respective association feature from the image features, each association feature characterizing mutual information between the images in the image pair to be processed;

identifying, for each image in the image pair, a respective common view image of a common view region in the respective image to be processed according to the respective association feature, and calculating a scale difference between the common view images;

adjusting a size of each common view image based on the scale difference to obtain a respective adjusted common view image; and extracting at least one common view feature point from each of the adjusted common view images, and processing the image pair to be processed based on the at least one common view feature point.

19. A computer-readable storage medium, storing a computer-readable instruction, the computer-readable instruction implementing steps of an image processing method, performed by a one or more processors, the method comprising:

acquiring an image pair to be processed, and performing image feature extraction on each image to be processed in the image pair to be processed to obtain a respective image feature of the image to be processed;

extracting, for each image in the image pair, a respective association feature from the image features, each association feature characterizing mutual information between the images in the image pair to be processed;

identifying, for each image in the image pair, a respective common view image of a common view region in the respective image to be processed according to the respective association feature, and calculating a scale difference between the common view images;

adjusting a size of each common view image based on the scale difference to obtain a respective adjusted common view image; and extracting at least one common view feature point from each of the adjusted common view images, and processing the image pair to be processed based on the at least one common view feature point.

20. The computer-readable storage medium according to claim 19, wherein the identifying, for each image in the image pair, the respective common view image of the common view region in the respective image to be processed according to the respective association feature comprises:

acquiring a region feature, and performing feature extraction on the region feature by using a trained image processing model to obtain an initial region feature;

performing cross feature extraction on the initial region feature and the respective association feature to obtain a common view region feature corresponding to the initial region feature; and identifying the common view image in the common view region in the image to be processed based on the common view region feature and the respective association feature.

* * * * *